United States Patent
Kohno et al.

(10) Patent No.: US 8,412,113 B2
(45) Date of Patent: *Apr. 2, 2013

(54) RADIO COMMUNICATION DEVICE, PROGRAM, RADIO COMMUNICATION METHOD, AND RADIO COMMUNICATION SYSTEM

(75) Inventors: Michinari Kohno, Tokyo (JP); Kenji Yamane, Tokyo (JP)

(73) Assignee: Sony Corporation, Tokyo (JP)

( * ) Notice: Subject to any disclaimer, the term of this patent is extended or adjusted under 35 U.S.C. 154(b) by 193 days.

This patent is subject to a terminal disclaimer.

(21) Appl. No.: 12/741,551

(22) PCT Filed: Aug. 12, 2008

(86) PCT No.: PCT/JP2008/064467
§ 371 (c)(1),
(2), (4) Date: May 5, 2010

(87) PCT Pub. No.: WO2009/063664
PCT Pub. Date: May 22, 2009

(65) Prior Publication Data
US 2010/0261433 A1    Oct. 14, 2010

(30) Foreign Application Priority Data

Nov. 15, 2007 (JP) .................. 2007-297154
Mar. 10, 2008 (JP) .................. 2008-060330

(51) Int. Cl.
*H04B 17/00* (2006.01)
(52) U.S. Cl. ............... 455/67.13; 455/41.2; 455/67.11; 342/450; 342/458

(58) Field of Classification Search ............... 455/41.2, 455/67.11, 67.13, 68, 456.1, 456.2, 456.3, 455/456.5; 342/450, 458
See application file for complete search history.

(56) References Cited

U.S. PATENT DOCUMENTS

| | | |
|---|---|---|
| 5,729,557 A | 3/1998 | Gardner et al. |
| 6,052,064 A | 4/2000 | Budnik et al. |
| 6,087,961 A | 7/2000 | Markow |
| 6,594,494 B1 | 7/2003 | Kakehi |

(Continued)

FOREIGN PATENT DOCUMENTS

| | | |
|---|---|---|
| EP | 1 489 432 A1 | 12/2004 |
| EP | 1 811 426 A2 | 7/2007 |

(Continued)

OTHER PUBLICATIONS

Extended European Search Report issued Jul. 20, 2012, in Munich in corresponding European Application No. EP 08 85 0303.

(Continued)

*Primary Examiner* — Tuan N Nguyen
(74) *Attorney, Agent, or Firm* — Finnegan, Henderson, Farabow, Garrett & Dunner LLP.

(57) ABSTRACT

Provided is a radio communication device including a reception unit that receives a radio signal, a measurement unit that measures a field intensity of the radio signal received by the reception unit, a determination unit that determines whether the radio signal received by the reception unit satisfies a predetermined condition for a noise component, and an estimation unit that estimates a distance from a transmission source device of the radio signal based on the field intensity of the radio signal determined by the determination unit to satisfy the predetermined condition.

12 Claims, 18 Drawing Sheets

U.S. PATENT DOCUMENTS

| | | |
|---|---|---|
| 7,155,655 B2 | 12/2006 | Cheng |
| 7,349,707 B2 | 3/2008 | Shinmei |
| 7,437,132 B2 * | 10/2008 | Hanabusa et al. ............ 455/130 |
| 7,523,756 B2 * | 4/2009 | Minai et al. .................... 128/899 |
| 7,668,556 B2 | 2/2010 | Yokoshi et al. |
| 7,949,066 B2 | 5/2011 | Zehavi |
| 8,085,865 B2 | 12/2011 | Zehavi |
| 2004/0214565 A1 | 10/2004 | Shinmei |
| 2005/0170848 A1 | 8/2005 | Sato et al. |
| 2005/0209921 A1 | 9/2005 | Roberts et al. |
| 2005/0228613 A1 | 10/2005 | Fullerton et al. |
| 2006/0267841 A1 | 11/2006 | Lee et al. |
| 2007/0010200 A1 | 1/2007 | Kaneko |
| 2007/0060170 A1 | 3/2007 | Fukui |
| 2007/0097900 A1 | 5/2007 | Kim et al. |
| 2007/0124625 A1 | 5/2007 | Hassan et al. |
| 2007/0142944 A1 | 6/2007 | Goldberg et al. |
| 2007/0178837 A1 | 8/2007 | Koike |
| 2011/0312368 A1 | 12/2011 | Hamdi et al. |

FOREIGN PATENT DOCUMENTS

| | | |
|---|---|---|
| JP | 5-167471 | 7/1993 |
| JP | 2002-300545 | 10/2002 |
| JP | 2002-300548 | 10/2002 |
| JP | 2002-300548 A | 10/2002 |
| JP | 2002-325211 | 11/2002 |
| JP | 2002-325211 A | 11/2002 |
| JP | 2004-032394 | 1/2004 |
| JP | 2004-328542 | 11/2004 |
| JP | 2005-249743 | 9/2005 |
| JP | 2005-291717 | 10/2005 |
| JP | 2005-301428 | 10/2005 |
| JP | 2005-301804 | 10/2005 |
| JP | 2006-81036 | 3/2006 |
| JP | 2006-253765 | 9/2006 |
| JP | 2006-300918 | 11/2006 |
| JP | 2007-71816 | 3/2007 |
| JP | 2007-189726 | 7/2007 |
| KR | 2008-0069337 | 7/2008 |

OTHER PUBLICATIONS

Extended European Search Report issued Jul. 17, 2012, in Munich in corresponding European Application No. EP 08 85 0127.

Extended European Search Report issued Jul. 7, 2012, in Munich in corresponding European Application No. EP 08 79 2400.

Supplementary European Search Report issued Sep. 6, 2012, in Munich in corresponding European Application No. EP 08 84 9521.

Yamada et al., Indoor Area Estimation based on Propagation Loss Characteristics of Wireless LAN, Technical Research Report of the Institute of Electronics, Information and Communication Engineers, Feb. 23, 2006, vol. 105, No. 627, pp. 181-184.

JP Office Action dated Oct. 2, 2012, issued in Japanese Patent Application No. 2008-068226.

* cited by examiner

| DEVICE INFORMATION | EVALUATION FORMULA |
|---|---|
| Model 001 | EVALUATION FORMULA 1 |
| Model 002 | EVALUATION FORMULA 2 |
| Model 003 | EVALUATION FORMULA 3 |
| Model 004 | EVALUATION FORMULA 4 |

RADIO COMMUNICATION DEVICE, PROGRAM, RADIO COMMUNICATION METHOD, AND RADIO COMMUNICATION SYSTEM

TECHNICAL FIELD

The present invention relates to a radio communication device, a program, a radio communication method, and a radio communication system.

BACKGROUND ART

Recently, portable radio communication devices including a radio communication function have been widely used. The radio communication device can perform radio communication with other radio communication devices by directly transmitting/receiving radio signals to/from other radio communication device, for example. Radio communication by such radio communication device sometimes is referred to as an ad-hoc mode in comparison with an infrastructure mode which requires a base station.

The field intensity of a radio signal transmitted from a radio communication device is known to be inversely proportional to the square or cube of the distance in close proximity to the radio communication device being a signal transmission source and inversely proportional to the distance in no proximity in the ideal space. Such characteristics of the field intensity of a radio signal are established also in the wireless LAN (Local Area Network) specifications such as IEEE 802.11b or 11g, for example. A technique of estimating the distance between radio communication devices with use of such characteristics of the field intensity of a radio signal is described in Patent Literature 1, for example.

Patent Literature 1: JP 2006-300918 (A)

DISCLOSURE OF INVENTION

Technical Problem

However, in reality, the field intensity of a radio signal is affected by interference fading, polarization fading, skip fading or the like. Therefore, the field intensity of a radio signal generally keeps varying without being stabilized even when the distance from the radio communication device remains constant. It has thus been difficult to estimate an accurate distance between radio communication devices in a hitherto known radio communication device.

The present invention is made in view of the above-mentioned issue, and aims to provide a novel and improved radio communication device, program, radio communication method, and radio communication system that enable estimation of a distance from a transmission source of a radio signal with higher accuracy.

Technical Solution

According to an aspect of the present invention in order to achieve the above-mentioned object, there is provided a radio communication device including a reception unit that receives a radio signal, a measurement unit that measures a field intensity of the radio signal received by the reception unit, a determination unit that determines whether the radio signal received by the reception unit satisfies a predetermined condition for a noise component, and an estimation unit that estimates a distance from a transmission source device of the radio signal based on the field intensity of the radio signal determined by the determination unit to satisfy the predetermined condition.

In this configuration, the estimation unit estimates a distance from a transmission source device of a radio signal based on a field intensity of a radio signal determined to satisfy a predetermined condition about a noise component by the judgment unit among radio signals received by the reception unit. Thus, the radio communication device can estimate a distance from a transmission source device by selectively using a field intensity of a radio signal received by the reception unit.

The determination unit may determine that the predetermined condition is satisfied when the noise component of the radio signal is greater than a set lower limit value and lower than an set upper limit value. When the noise component of a radio signal is lower than the set lower limit value, it is assumed that the reception environment of the reception unit is remarkably deteriorated. Further, when the noise component of a radio signal is greater than the set upper limit value, it is assumed that the reception environment of the reception unit is temporarily excessively good. Accordingly, when the noise component of a radio signal is greater than the set lower limit value and lower than the set upper limit value, it is assumed that the reception environment of the reception unit is almost in a steady state. Thus, the determination unit determines that the predetermined condition is satisfied when the noise component of a radio signal is greater than the set lower limit value and lower than the set upper limit value as described above, so that the estimation unit can estimate the distance from the transmission source device based on the field intensity that is assumed to be almost in a steady state. Consequently, the radio communication device can estimate the distance from the transmission source device of a radio signal with higher accuracy.

The radio communication device may further include a transmission unit that transmits a radio signal, and may also include a control unit that controls the transmission unit to transmit the radio signal when the radio signal is received by the reception unit. When a radio signal from the transmission source device is received by the reception unit, because the condition of a radio link is suitable, a radio signal transmitted from the transmission unit is expected to reach the transmission source device. Then, the transmission source device can estimate the distance from the radio communication device based on the radio signal received from the radio communication device. Thus, since the control unit controls the transmission unit to transmit a radio signal in response to a reception of a radio signal, transmission of radio signals which will not reach the transmission source device can be prevented so that the usage of the communication resource amount can be reduced.

The reception unit may receive, from the transmission source device in advance, device information indicating a transmitting power for the radio signal from the transmission source device, and the estimation unit may estimate the distance from the transmission source device of the radio signal by using the device information. In this configuration, the estimation unit can estimate an appropriate distance from the transmission source device by using the device information even when a transmitting power of a radio signal is different depending on the transmission source device.

The estimation unit may calculate an average value of the field intensity of the radio signal determined by the determination unit to satisfy the predetermined condition, determine in which of defined average value ranges the average value is included, and estimate the distance from the transmission source device of the radio signal to be a distance corresponding to the average value range in which the average value is determined to be included. Note that, a moving average value of field intensities of radio signals may be calculated as the average value.

The average value ranges or calculation of the average value may vary by the device information.

The unique information may indicate the transmitting power for the radio signal from the transmission source device or a model of the transmission source device.

There may be further included a display unit that displays distance information corresponding to the distance from the transmission source device estimated by the estimation unit. The estimation unit may cause the display unit to display the distance information for each estimated distance from the transmission source device.

The estimation unit may determine whether the distance from the transmission source device satisfies the predetermined condition and further causes the display unit to display information corresponding to a determination result.

There may be further included a transmission unit that transmits a radio signal, and may be also included a control unit that controls, based on the determination result determined by the estimation unit, the transmission unit to transmit the radio signal indicating whether the distance from the transmission source device satisfies the predetermined condition.

According to yet another aspect of the present invention in order to achieve the above-mentioned object, there is provided a program causing a computer to function as a radio communication device including a reception unit that receives a radio signal, a measurement unit that measures a field intensity of the radio signal received by the reception unit, a determination unit that determines whether the radio signal received by the reception unit satisfies a predetermined condition for a noise component, and an estimation unit that estimates a distance from a transmission source device of the radio signal based on the field intensity of the radio signal determined by the determination unit to satisfy the predetermined condition.

The above program can cause a computer hardware resource that includes CPU, ROM, RAM or the like to execute the functions of the determination unit and the estimation unit described above. It is thereby possible to allow a computer that implements the program to function as the above-described radio communication device.

According to yet another aspect of the present invention in order to achieve the above-mentioned object, there is provided a radio communication method comprising the steps of receiving a radio signal, measuring a field intensity of the received radio signal, determining whether the received radio signal satisfies a predetermined condition for a noise component, and estimating a distance from a transmission source device of the radio signal based on the field intensity of the radio signal determined to satisfy the predetermined condition.

According to yet another aspect of the present invention in order to achieve the above-mentioned object, there is provided a radio communication system including a first radio communication device and a second radio communication device. The first radio communication device transmits a radio signal to the second radio communication device. The second radio communication device includes a reception unit that receives the radio signal, a measurement unit that measures a field intensity of the radio signal received by the reception unit, a determination unit that determines whether the radio signal received by the reception unit satisfies a predetermined condition for a noise component, and an estimation unit that estimates a distance from the first radio communication device based on the field intensity of the radio signal determined by the determination unit to satisfy the predetermined condition.

Advantageous Effects

As described above, the radio communication device, the program, the radio communication method, and the radio communication system according to the present invention enable estimation of a distance from a transmission source of a radio signal with higher accuracy.

Figure 1:
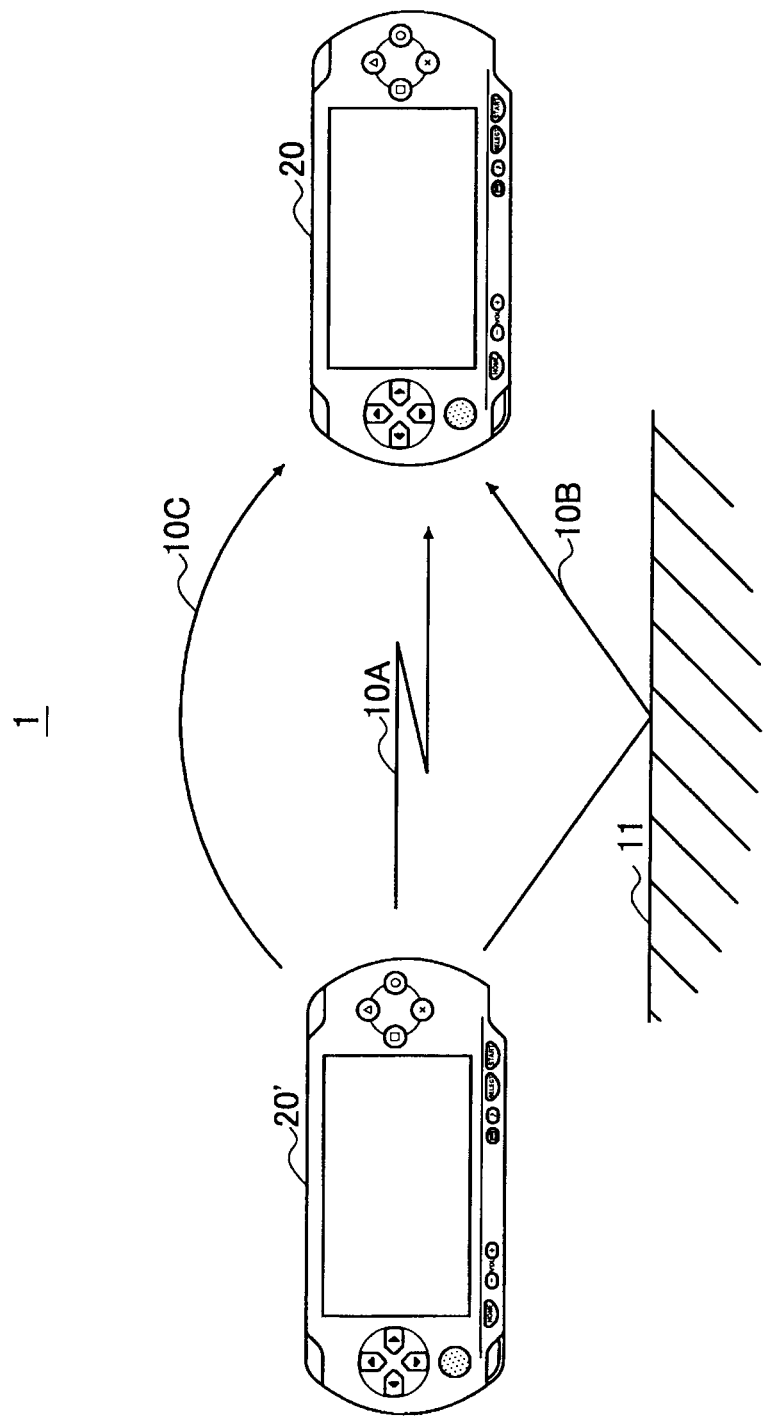
FIG. 1 is an explanatory view showing a configuration of a radio communication system according to an embodiment.

EXPLANATION OF REFERENCE 20, 20' radio communication device
216 communication unit
220 field intensity measurement unit
224 noise floor measurement unit
228 memory unit
232 estimation unit
236 determination unit
240 display unit
244 communication control unit

BEST MODE FOR CARRYING OUT THE INVENTION

Hereinafter, preferred embodiments of the present invention will be described in detail with reference to the appended drawings. Note that, in this specification and the drawings, elements that have substantially the same function and structure are denoted with the same reference signs, and repeated explanation is omitted.

"Preferred embodiments of the present invention" will be described hereinafter in the following order.

[1] Overview of radio communication system according to embodiment
[2] Radio communication device constituting radio communication system
  [2-1] Hardware configuration of radio communication device
  [2-2] Functions of radio communication device
  [2-3] Operation of radio communication device
[3] Summary
[4] Example of application of radio communication system

[1] Overview of Radio Communication System According to Embodiment

Firstly, a radio communication system 1 according to the present embodiment will be schematically described with reference to FIG. 1.

FIG. 1 is an explanatory view showing a configuration of the radio communication system 1 according to the present embodiment. As shown in FIG. 1, the radio communication system 1 according to the present embodiment includes a plurality of radio communication devices 20 and 20'.

The radio communication devices 20 and 20' are capable of transmitting/receiving radio signals including various data (streaming data, distance measurement packets and the like) to/from each other. The various data include audio data such as music, lectures and radio programs, video data such as movies, TV programs, video programs, photographs, documents, paintings and graphic charts or other any data such as games and software.

Further, in FIG. 1, portable game machines are shown as examples of the radio communication devices 20 and 20'; however, the radio communication devices 20 and 20' are not limited to those portable game machines. For example, the radio communication devices 20 and 20' may be information processing devices such as PCs (Personal Computers), household video processors (DVD recorder, videocassette recorder and the like), mobile phones, PHSs (Personal Handyphone Systems), portable music players, portable video processors, PDAs (Personal Digital Assistants), household game machines and household electric appliances.

Here, the radio communication devices 20 and 20' may perform radio communication using a frequency bandwidth of 2.4 GHz that is specified in IEEE 802.11b or may perform radio communication using a frequency bandwidth specified in IEEE 802.11a, g and n. Further, the radio communication devices 20 and 20' may operate using ZigBee that is specified in IEEE 802.15.4. Further, FIG. 1 shows the radio communication system 1 of an ad-hoc mode in which the radio communication devices 20 and 20' directly communicate with each other; however, the radio communication system 1 may be in an infrastructure mode in which the radio communication devices 20 and 20' communicate via a base station. Furthermore, in the radio communication system 1, in addition to point-to-point radio communication but also point-to-multipoint or multipoint-to-multipoint radio communication can be realized.

The field intensity of a radio signal transmitted from the radio communication device 20 or 20' are affected by interference fading, polarization fading, skip fading or the like. Interference fading is a phenomenon in which radio signals, which are propagated via a plurality of paths and come to a receiving point, interfere with each other at the receiving point. Further, polarization fading is a phenomenon in which a rotation of a plane of polarization occurs during a propagation of radio signals and radio waves having different planes of polarization interfere with each other at a receiving point. Furthermore, skip fading is a phenomenon in which an interference occurs due to an affect of the ionosphere around the earth.

For example, as shown in FIG. 1, when the radio communication device 20' transmits a radio signal, the radio communication device 20 receives the radio signal as a direct wave 10A, a reflected wave 10B (reflected by a subject 11) or a diffracted wave 10C, for example.

Thus, the field intensity of the radio signal received by the radio communication device 20 from the radio communication device 20' constantly varies. Particularly, since the portable game machines described as examples of the radio communication devices 20 and 20' have a low transmitting power, those portable game machines are easily affected by fading. Thus, a radio communication device cannot estimate an accurate distance from the transmission source device of the radio signal by using the field intensity of all radio signals received in a predetermined period of time.

Thus, in view of the above issue, the radio communication device 20 according to the present embodiment has been created. In the radio communication device 20 according to the present embodiment, a distance from a transmission source of a radio signal can be estimated with a higher degree of accuracy. The radio communication device 20 will be described in detail with reference to FIGS. 2 to 15.

[2] Radio Communication Device Constituting Radio Communication System

[2-1] Hardware Configuration of Radio Communication Device

Figure 2:
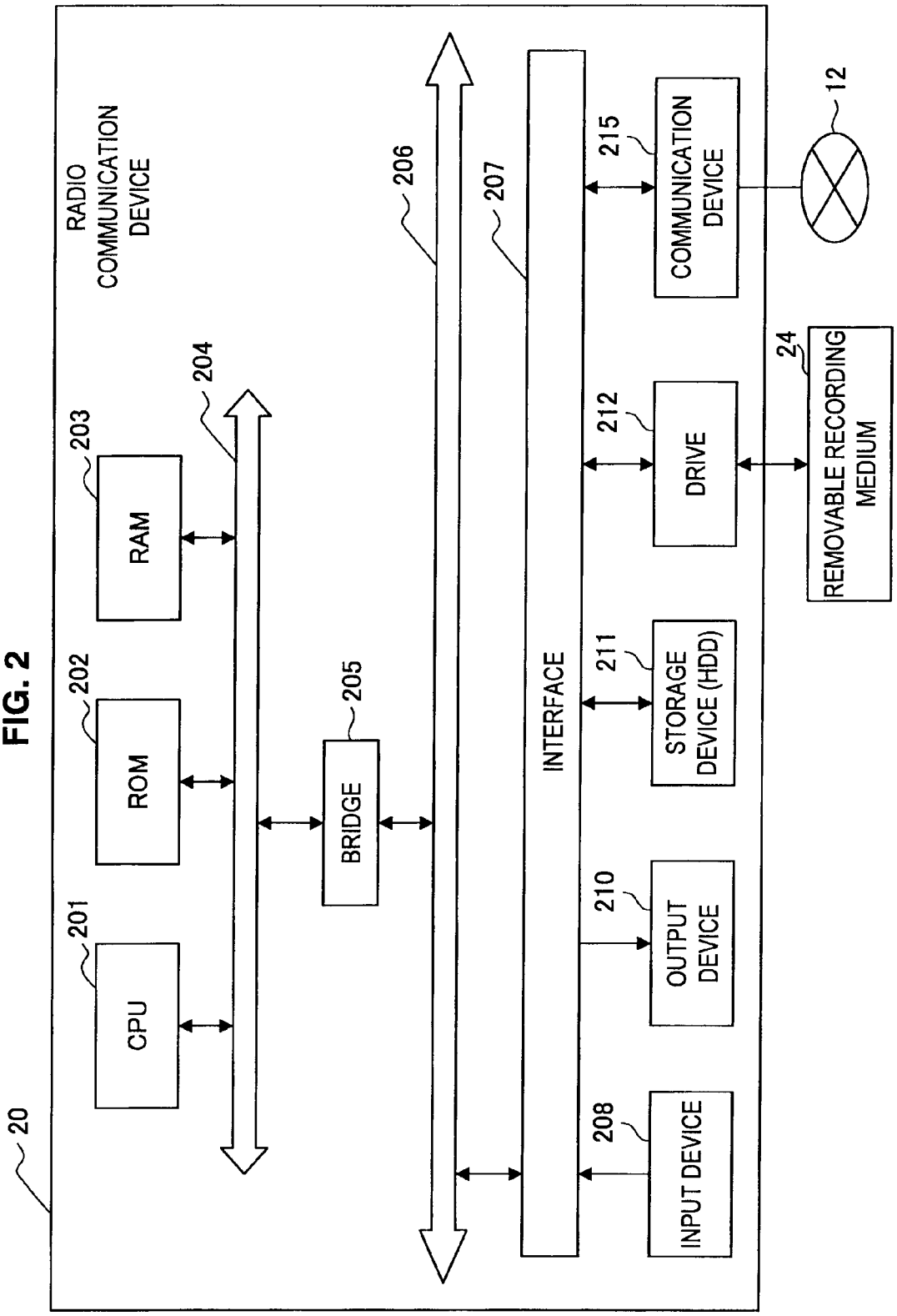
FIG. 2 is a block diagram showing a hardware configuration of a radio communication device.

FIG. 2 is a block diagram showing a hardware configuration of the radio communication device 20. The radio communication device 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212 and a communication device 215.

The CPU 201 functions as an arithmetic processing device and a control device, and controls the overall operation of the radio communication device 20 according to various programs. Further, the CPU 201 can be a microprocessor. The ROM 202 stores programs, arithmetic parameters and the like which are used by the CPU 201. The RAM 203 temporarily stores programs used by the CPU 201 and parameters and the like which varies as appropriate during an implementation of the programs. These are connected to one another by the host bus 204 composed of a CPU bus and the like.

The host bus 204 is connected to the external bus 206 such as a PCI (Peripheral Component Interconnect/Interface) bus via the bridge 205. Note that the host bus 204, bridge 205 and external bus 206 do not have to be separately provided and those functions may be mounted in a single bus.

The input device 208 is composed of an input means, which is used by a user to input information, such as a mouse, a keyboard, a touch panel, a button, a microphone, a switch and a lever, and an input control circuit for generating input signals based of user's input and outputting to the CPU 201. By operating the input device 208, the user of the radio communication device 20 can input various data and instruct processing operation to the radio communication device 20.

The output device 210 is composed of a display device such as a CRT (Cathode Ray Tube) display device, a liquid crystal display (LCD) device, an OLED (Organic Light Emitting Diode) device and a lamp, and an audio output device such as a speaker and a headphone. The output device 210 outputs a reproduced content, for example. Specifically, the display device displays various information such as reproduced video data and the like in form of texts or images. On the other hand, the audio output device converts reproduced sound data and the like to sound and outputs the sound.

The storage device 211 is a data storing device composed as an example of a memory unit of the radio communication device 20 according to the present embodiment. The storage device 211 may include a memory medium, a recording device for recording data to the memory medium, a readout device for reading data from the memory medium, a deletion device for deleting data recorded in the memory medium, and the like. The storage device 211 is composed of a HDD (Hard Disk Drive) for example. The storage device 211 drives a hard disk and stores programs and various data which are executed by the CPU 201. Further, in the storage device 211, later described field intensity, noise floor and the like are recorded in association with users.

The drive 212 is a reader/writer for a memory medium and is internally mounted in or externally connected to the radio communication device 20. The drive 212 reads information from an attached magnetic disc, optical disc, magnetic-optical disc, or a removable recording memory 24 such as a semiconductor memory, and outputs to the RAM 203.

The communication device 215 is a communication interface composed of a communication device for connecting to a communication network 12, for example. Further, the communication device 215 may be a communication device for a wireless LAN, a communication device for a wireless USB, or a wired communication device for a wired communication. The communication device 215 transmits/receives radio signals to/from other radio communication device 20'.

Here, the hardware configuration of the radio communication device 20' can substantially be the same as the hardware configuration of the above described radio communication device 20, so the detailed description will be omitted.

[2-2] Functions of Radio Communication Device

The hardware configuration of the radio communication device 20 has been described with reference to FIG. 2. Next, functions of the radio communication device 20 according to the present embodiment will be described.

Figure 3:
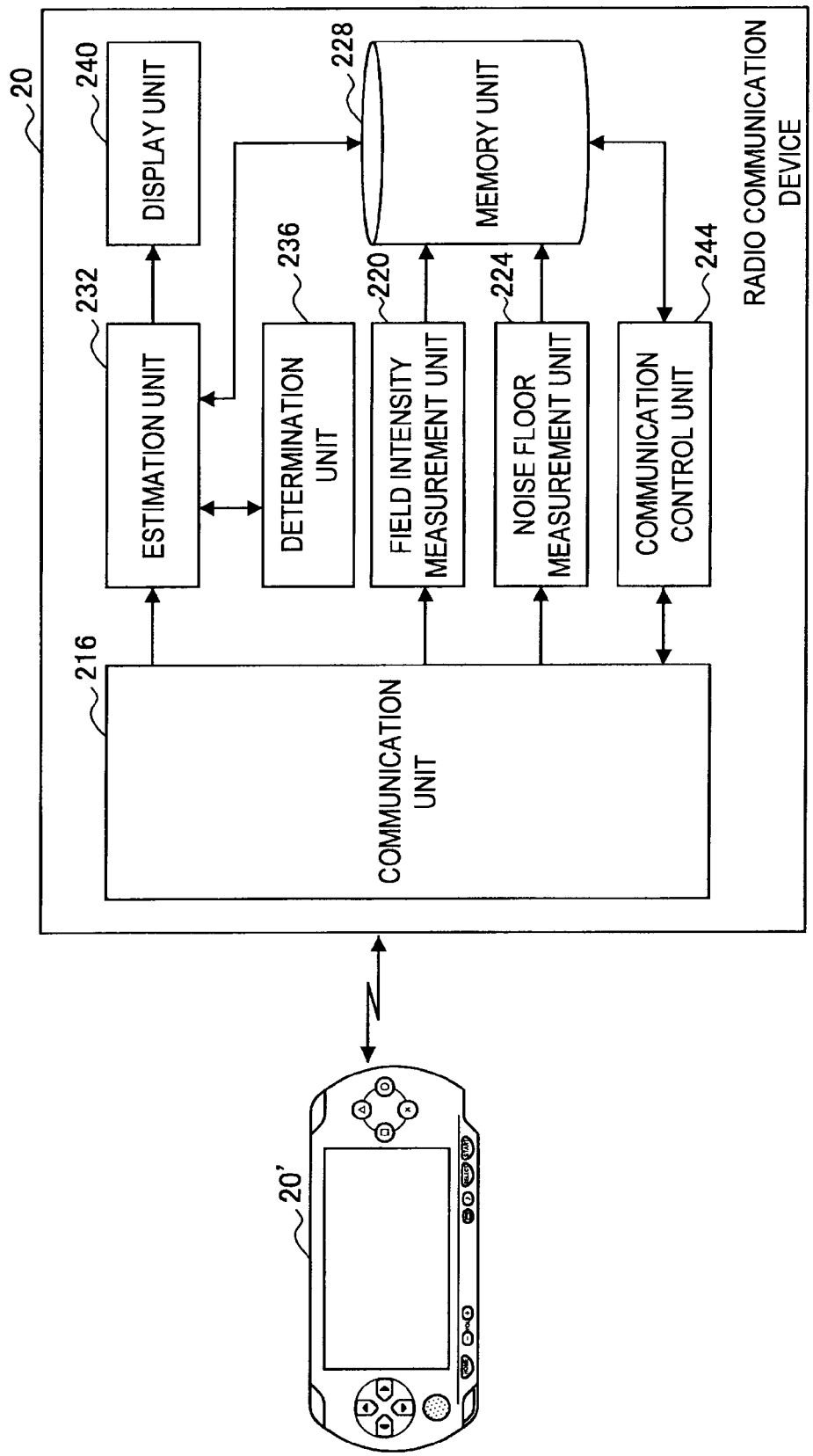
FIG. 3 is a functional block diagram showing a configuration of a radio communication device.

FIG. 3 is a functional block diagram showing the configuration of the radio communication device 20 according to the present embodiment. As shown in FIG. 3, the radio communication device 20 includes a communication unit 216, a field intensity measurement unit 220, a noise floor measurement unit 224, a memory unit 228, an estimation unit 232, a determination unit 236, a display unit 240 and a communication control unit 244.

The communication unit 216 is an interface for transmitting/receiving radio signals such as a distance measurement packet or streaming data to/from other radio communication device 20' and has functions as a transmission unit and a reception unit.

The other radio communication device 20' generates a distance measurement packet and periodically transmits to the radio communication device 20. The distance measurement packet is a packet used by the radio communication device 20 to measure the distance between the radio communication device 20 and the radio communication device 20'. When there are data to be transmitted from the other radio communication device 20' to the radio communication device 20, the data can be included in the distance measurement packet. Further, the distance measurement packet has a data amount equal to or greater than 1 byte. Note that the radio communication device 20 can estimate the distance from the radio communication device 20' based on streaming data without using the distance measurement packet.

Further, the communication unit 216 receives device information that indicates a transmitting power of the radio communication device 20' before receiving the distance measurement packet.

Figure 4:
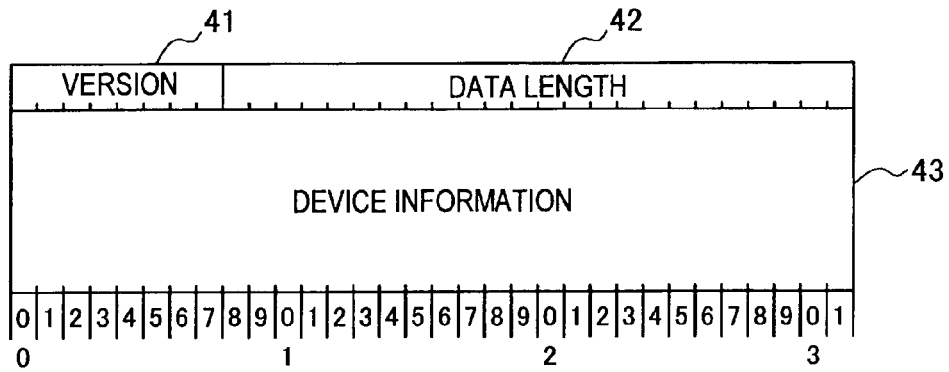
FIG. 4 is an explanatory view showing an example of a packet configuration including device information.

FIG. 4 is an explanatory view showing an example of a packet configuration including device information. This packet includes, as shown in FIG. 4, a version 41 which is 8 bytes in length and is a value of format version of the packet, a data length 42 of the packet and device information 32.

Figure 5:
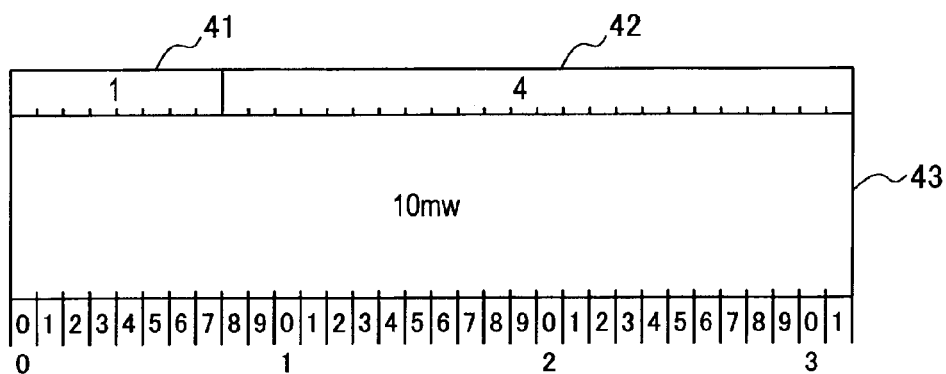
FIG. 5 is an explanatory view showing an illustrative example of a packet including device information.
Figure 6:
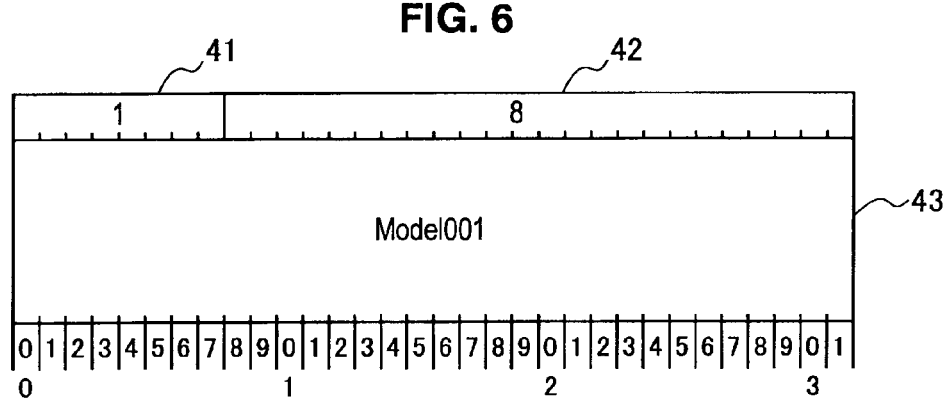
FIG. 6 is an explanatory view showing an illustrative example of a packet including device information.

FIGS. 5 and 6 are explanatory views showing illustrative examples of a packet including device information. In the example shown in FIG. 5, the version 41 is "1," the data length 42 is "4," and the device information 32 is "10 mw." The "10 mw" written as the device information 32 is a transmitting power of the radio communication device 20' upon transmitting a radio signal.

Further, in the example shown in FIG. 6, the version 41 is "1," the data length 42 is "8," and the device information 32 is "Model001." The "Model001" written as the device information 32 is an antenna type of the radio communication device 20' or radio communication device 20'. Base on the type, a transmitting power of the radio communication device 20' can be specified.

As described above, since the communication unit 216 receives device information including a transmitting power or a type of the radio communication device 20' in advance, the estimation unit 232 is allowed to estimate the distance from the radio communication device 20' according to the content of the device information. Note that the format of the packet including the device information is not limited to the example shown in FIG. 4 and any format such as a serial number of the radio communication device 20' can be used if it can be recognized between applications (programs) of the radio communication device 20 and radio communication device 20'.

The field intensity measurement unit 220 has a function as a measurement unit for measuring a field intensity (reception intensity) of the distance measurement packet received by the communication unit 216. The field intensity measurement unit 220 may obtain the field intensity from an API (Application Program Interface), a function, a driver applicable to a wireless hardware, or the like.

The noise floor measurement unit 224 measures a noise floor indicating a level of noise included in the distance measurement packet received by the communication unit 216. In general, differently from an S/N (signal-to-noise) ratio, a greater value of the noise floor indicates a worse radio wave environment (a larger noise component) and a smaller value indicates a better radio wave environment (a smaller noise component). The noise floor measurement unit 224 may obtain the noise floor from an API (Application Program Interface), a function, a driver applicable to a wireless hardware, or the like.

The memory unit 228 stores the field intensity of the distance measurement packet that is measured by the field intensity measurement unit 220 and the noise floor value of the distance measurement packet that is measured by the noise floor measurement unit 224. Further, the memory unit 228 stores the device information received by the communication unit 216 in advance in association with a later described threshold value N and threshold value F, an evaluation formula or the like.

Here, the memory unit 228 may be a memory medium of a nonvolatile memory such as an EEPROM (Electrically Erasable Programmable Read-Only Memory) and an EPROM (Erasable Programmable Read Only Memory), a magnetic disc such as a hard disk and a disctype magnetic substance disk, an optical disc such as a CD-R (Compact Disc Recordable), a /RW (ReWritable), a DVD-R (Digital Versatile Disc Recordable) a /RW/+R/+RW/RAM (Ramdam Access Memory) and a BD (Blu-Ray Disc (registered trademark)) -R/BD-RE, or an MO (Magneto Optical) disc.

The estimation unit 232 estimates a distance from the radio communication device 20' using the field intensity and the noise floor value, which is determined by the determination unit 236 to satisfy a predetermined condition, among the field intensities and noise floor values stored in memory unit 228. Hereinafter, a determination by the determination unit 236 will be described after a specific description of the functions of the estimation unit 232.

Firstly, the estimation unit 232 maintains a pair of a field intensity and a noise floor value which is determined by the determination unit 236 to satisfy a predetermined condition as a distance measurement database. Then, when the following condition A is satisfied, a distance measurement evaluation value is calculated.

(Condition A)
1. A set period has passed.
2. The number of pairs of the field intensity and noise floor value is increased by a fixed number.
3. The accumulated number of pairs of the field intensity and noise floor value excesses a predetermined value.

One of the above 1 to 3 or a combination.

Figures 7, 8:
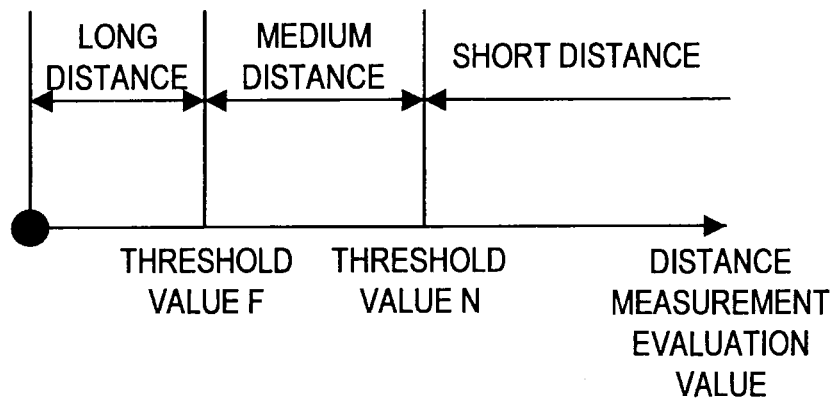
FIG. 7 is an explanatory view showing a relationship between distance measurement evaluation values and estimated distances.
FIG. 8 is an explanatory view showing an example in which device information and evaluation formulas are associated and stored in a memory unit.

Note that the distance measurement evaluation value may be an average value of field intensities in the distance measurement database or a latest field intensity. As shown in FIG. 7, for example, the estimation unit 232 estimates the distance between the radio communication devices 20 and 20' based on the magnitude of the distance measurement evaluation value.

FIG. 7 is an explanatory view showing a relationship between distance measurement evaluation values and estimated distances. As shown in FIG. 7, when the distance measurement evaluation value is smaller than the threshold value F, the estimation unit 232 estimates that the distance between the radio communication devices 20 and 20' is a long distance. Further, when the distance measurement evaluation value is greater than the threshold value N, the estimation unit 232 estimates that the distance between the radio communication devices 20 and 20' is a short distance. Further, when the distance measurement evaluation value is equal to or greater than the threshold value F or equal to or smaller than the threshold value N, the estimation unit 232 estimates that the distance between the radio communication devices 20 and 20' is a medium distance.

Note that the threshold value N and threshold value F may be stored in association with device information in the memory unit 228. In this case, the estimation unit 232 may extract the threshold value N and threshold value F from the memory unit 228, which correspond to the device information received from the radio communication device 20' in advance. It is assumed that the threshold value N and threshold value F associated with device information that indicates a relatively high transmitting power tend to be relatively great values.

Further, as a substitute for the threshold value N and threshold value F, a evaluation formula for calculating a distance measurement evaluation value may be associated with the device information and stored in the memory unit 228 as shown in FIG. 8.

FIG. 8 is an explanatory view showing an example in which device information and evaluation formulas are associated and stored in the memory unit 228. More specifically, device information "Model001" is associated with an evaluation formula 1 and device information "Model002" is associated with an evaluation formula 2. Device information "Model003" and device information "Model004" are also associated with evaluation formulas.

For example, the evaluation formula 1 may be (added value of latest three field intensities)/3, and the evaluation formula 2 may be (added value of latest three field intensities)/4.

Since each radio communication device 20' has different antenna shape, product shape, transmitting power or the like, in the radio communication device 20, it has been difficult to accurately estimate the distance between the radio communication devices 20 and 20' based on only the field intensity. Thus, when the device information is associated with a threshold value N, a threshold value F, and an evaluation formula and stored in the memory unit 228, the estimation unit 232 can perform a distance estimation for the radio communication device 20'.

The determination unit 236 determines whether the pair of the field intensity and noise floor value stored in the memory unit 228 satisfy a predetermined condition. Here, when the noise floor value is greater than an set upper limit value, it is assumed that the reception environment for receiving the distance measurement packet by the communication unit 216 is remarkably deteriorated. Further, when the noise floor value is lower than a set lower limit value, it is assumed that the reception environment for receiving the distance measurement packet by the communication unit 216 is excessively good. Thus, when the noise floor value is greater than the set lower limit value and lower than the set upper limit value, it is assumed that the reception environment for receiving the distance measurement packet by the communication unit 216 is almost in a steady state.

Thus, among the pairs of the field intensity and noise floor value, the determination unit 236 determines that a pair having a noise floor value that is equal to or greater than the set lower limit value and equal to or lower than the set upper limit value satisfies the predetermined condition and adds the pair to the distance measurement database maintained by the estimation unit 232. In other words, the determination unit 236 filters a pair of the field intensity and noise floor value that is to be used by the estimation unit 232 among the pairs of the field intensity and noise floor value stored in the memory unit 228. Note that the determination unit 236 may perform filtering when a pair of the field intensity and noise floor is recorded in the memory unit 228. A manner of filtering by the determination unit 236 will be described with reference to FIGS. 9 and 10.

Figure 9:
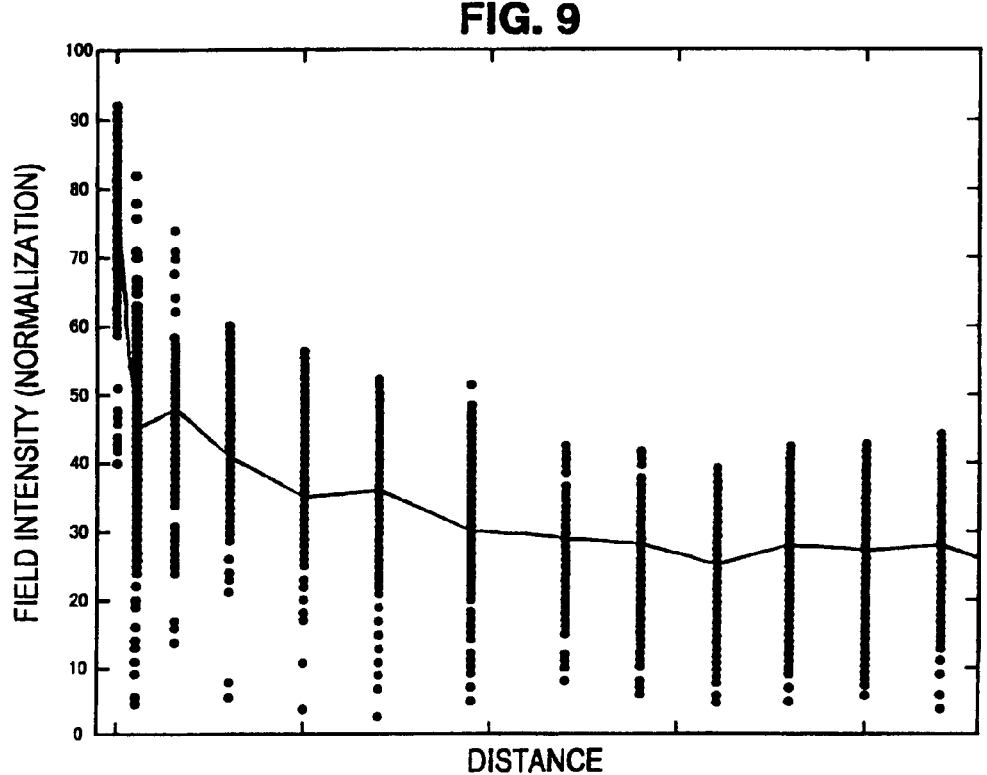
FIG. 9 is an explanatory view showing an illustrative example of distances between a plurality of radio communication devices and field intensities before filtering by a determination unit.

FIG. 9 is an explanatory view showing an illustrative example of distances between the radio communication devices 20 and 20' and the field intensities before filtering by the determination unit 236. More specifically, FIG. 9 shows field intensities obtained in respective distances as changing the distance between the radio communication devices 20 and 20' to a plurality of distances. As shown in FIG. 9, before filtering by the determination unit 236, the obtained field intensity varies in a range even when the distance of the radio communication devices 20 and 20' is the same.

Figure 10:
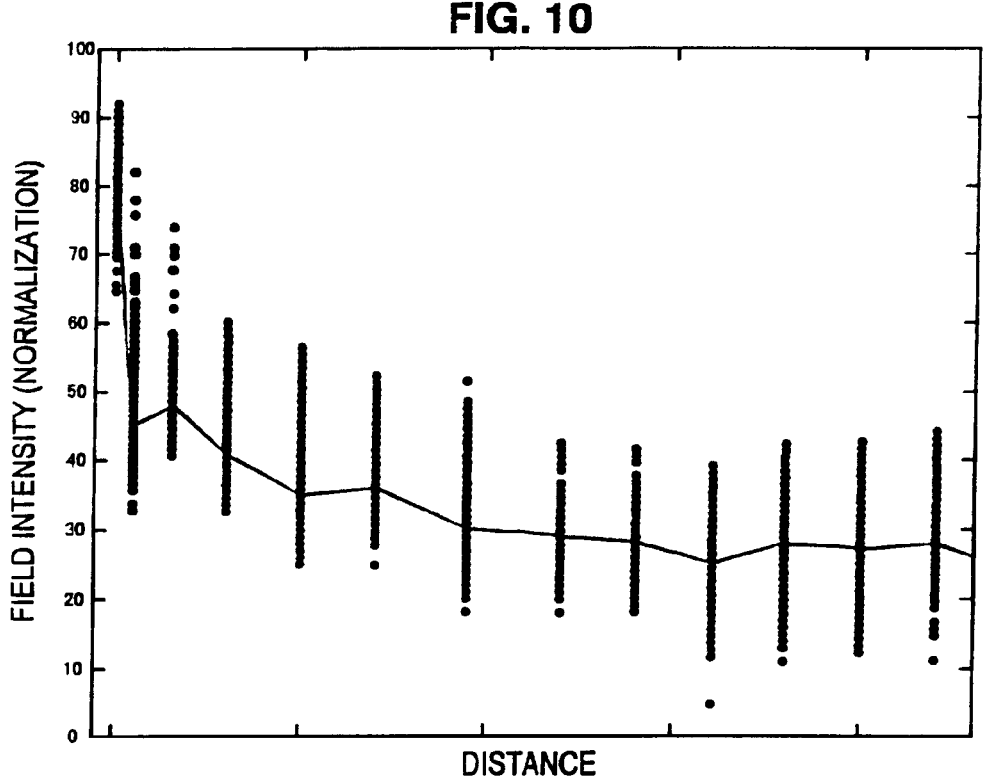
FIG. 10 is an explanatory view showing an illustrative example of distances between a plurality of radio communication devices and field intensities after filtering by a determination unit.

FIG. 10 is an explanatory view showing an illustrative example of distances between the radio communication devices 20 and 20' and the field intensities after filtering by the determination unit 236. As shown in FIG. 10, after the filtering by the determination unit 236, the range in which the field intensity varies is smaller while the distance between the radio communication devices 20 and 20' is the same compared to the case before the filtering by the determination unit 236.

As described above, when the field intensity used by the estimation unit 232 is filtered by the determination unit 236 based on the noise floor value, the estimation unit 232 can estimate distance between the radio communication devices 20 and 20' based on reliable field intensities. As a result, the accuracy of distance estimation by the estimation unit 232 will be improved. Hereinafter, an illustrative example of the distance estimation by the estimation unit 232 will be described with reference to FIG. 11.

Figure 11:
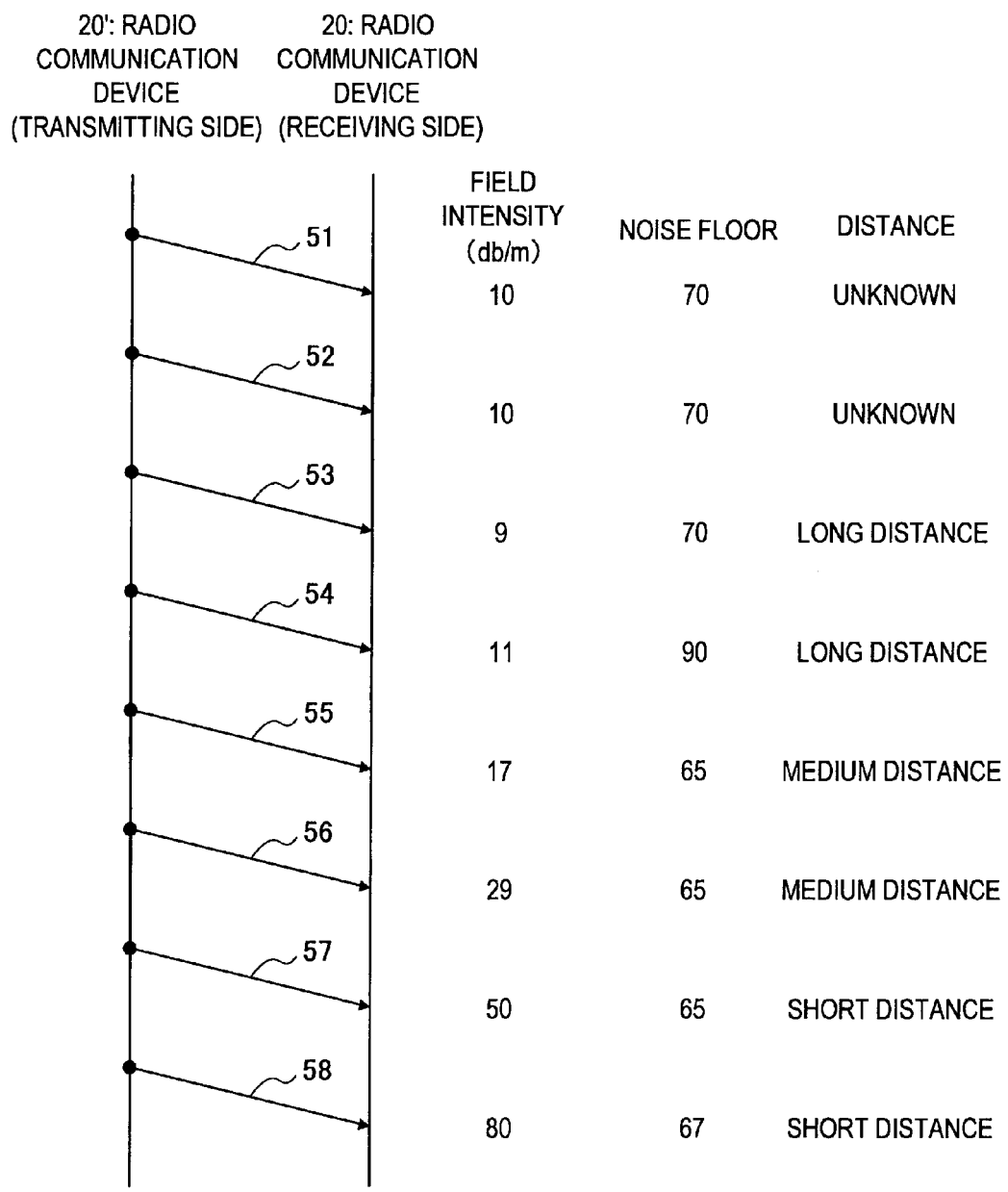
FIG. 11 is an explanatory view showing an illustrative example of a distance estimation by an estimation unit.

FIG. 11 is an explanatory view showing an illustrative example of a distance estimation by the estimation unit 232. Here, it is assumed that, in the condition A, three or more pairs of the field intensity and noise floor value are stored as the distance measurement database, and the set lower limit value is 50 and the set upper limit value is 70, which are used for filtering by the determination unit 236. The estimation unit 232 calculates a distance measurement evaluation value by averaging the last three field intensities and sets as threshold value F=10 and threshold value N=30.

As described in FIG. 11, firstly, the radio communication device 20 receives the distance measurement packet 51. Then, the radio communication device 20 measures a field intensity of the distance measurement packet 51 as 10 db/m and a noise floor as 70. Since the noise floor of the distance measurement packet 51 satisfies the predetermined condition of the determination unit 236, the pair of the field intensity and noise floor of the distance measurement packet 51 is maintained as a distance measurement database in the estimation unit 232. However, the number of the pairs of the field intensity and noise floor maintained as the distance measurement database in the estimation unit 232 has not reached three, so the estimation unit 232 concludes that the condition A is not satisfied and the distance from the radio communication device 20' is unknown.

Next, the radio communication device 20 receives a distance measurement packet 52. Then, the radio communication device 20 measures the field intensity of the distance measurement packet 52 as 10 db/m and the noise floor as 70. Since the noise floor of the distance measurement packet 52 satisfies the predetermined condition of the determination unit 236, the pair of the field intensity and noise floor of the distance measurement packet 52 is stored as the distance measurement database in the estimation unit 232. However, the number of the pairs of the field intensity and noise floor maintained as the distance measurement database of the estimation unit 232 has not reached three, so the estimation unit 232 concludes that the condition A is not satisfied and the distance from the radio communication device 20' is unknown.

After that, the radio communication device 20 receives a distance measurement packet 53. Then, the radio communication device 20 measures the field intensity of the distance measurement packet 53 as 9 db/m and the noise floor as 70. Since the noise floor of the distance measurement packet 53 satisfies the predetermined condition of the determination unit 236, the pair of the field intensity and noise floor of the distance measurement packet 53 is maintained as the distance measurement database in the estimation unit 232. Further, the number of pairs of the field intensity and noise floor maintained as the distance measurement database of the estimation unit 232 has reached three, so the estimation unit 232 calculates the distance measurement evaluation value as (10+10+9)/3=9.666 . . . . Since this distance measurement evaluation value is smaller than the threshold value F, the estimation unit 232 estimates that the distance from the radio communication device 20' is a long distance.

Further, the radio communication device 20 receives a distance measurement packet 54. Then, the radio communication device 20 measures the field intensity of the distance measurement packet 54 as 11 db/m and the noise floor as 90. The noise floor of the distance measurement packet 54 does not satisfy the predetermined condition (the set upper limit value is greater than 70) of the determination unit 236, the pair of the field intensity and noise floor of the distance measurement packet 54 is not used by the estimation unit 232. However, the number of pairs of the field intensity and noise floor maintained as the distance measurement database in the estimation unit 232 has reached three, so the estimation unit 232 calculates the distance measurement evaluation value as (10+10+9)/3=9.666 . . . . Since this distance measurement evaluation value is smaller than the threshold value F, the estimation unit 232 estimates the distance from the radio communication device 20' is a long distance.

Next, the radio communication device 20 receives a distance measurement packet 55. Then, the radio communication device 20 measures the field intensity of the distance measurement packet 55 as 17 db/m and the noise floor as 65. Since the noise floor of the distance measurement packet 55 satisfies the predetermined condition of the determination unit 236, the pair of the field intensity and noise floor of the distance measurement packet 55 is maintained as the distance measurement database in the estimation unit 232. Further, the number of pairs of the field intensity and noise floor maintained as the distance measurement database of the estimation unit 232 has reached three, so the estimation unit 232 calculates the distance measurement evaluation value as (10+9+17)/3=12. Since this distance measurement evaluation value is greater than the threshold value F and smaller than the threshold value N, the estimation unit 232 estimates that the distance from the radio communication device 20' to be a medium distance.

When distance measurement packets 56 to 58 are received, the estimation unit 232 can operate in the same manner and can estimate that the distance from the radio communication device 20' approaches to a short distance, as described below in detail.

The estimation unit 232 can cause the display unit 240 to display the estimated distance from the radio communication device 20' as distance information each time performing estimation. The display unit 240 may be LCD (Liquid Crystal Display), OLED display (or organic EL display (which is also called Organic Electro-Luminescence display) or the like, though not limited thereto. An example of distance information that is displayed on the display unit 240 by the estimation unit 232 is described later in [4] Example of application of radio communication system. The distance from the radio communication device 20' estimated by the estimation unit 232 may be utilized for an arbitrary application.

The estimation unit 232 may further determine whether the estimated distance from the radio communication device 20' satisfies a predetermined condition and cause the display unit 240 to information corresponding to a determination result. The estimation unit 232 may use "whether the distance from the radio communication device 20' becomes shorter than a predetermined distance" as the predetermined condition, for example, though not limited thereto. An example of information corresponding to a determination result that is displayed on the display unit 240 by the estimation unit 232 is described later in [4] Example of application of radio communication system.

Here, back to the explanation of the configuration of the radio communication device 20 with reference to FIG. 3, the communication control unit 244 has a function as a control unit for controlling a distance measurement packet transmission by the communication unit 216. Hereinafter, the purpose of the provision of the communication control unit 244 and detail functions thereof will be described.

As described with reference to FIG. 11, the radio communication device 20 can estimate the distance from the radio communication device 20' by receiving a distance measurement packet from the radio communication device 20'. Further, as a manner that the radio communication device 20' estimates the distance from the radio communication device 20, a manner that a distance measurement packet is sent from the radio communication device 20 can be considered.

However, if the radio communication device 20 simply transmits a distance measurement packet every predetermined period even when the radio communication device 20' has not been in a radio wave coverage, the communication resource is used unnecessarily.

Here, when the radio communication device 20 has received a distance measurement packet from the radio communication device 20', it is likely that the radio communication device 20' is in the radio wave coverage of the radio communication device 20. On the other hand, when the radio communication device 20 cannot receive a distance measurement packet from the radio communication device 20', it is likely that the radio communication device 20' is out of the radio wave coverage of the radio communication device 20 or the packet may be lost due to a deteriorated radio wave condition.

Then, for example, the radio communication device 20' is considered as a client, the radio communication device 20 is considered as a server, and the communication control unit 244 is assumed to control to transmit a distance measurement packet to the communication unit 216 when a distance measurement packet from the radio communication device 20' is received. Here, it is assumed that the radio communication device 20' transmits a distance measurement packet every predetermined period (a period of 100 ms, for example).

With the above described configuration, since the communication control unit 244 controls the communication unit 216 to transmit a radio signal in response to a reception of a distance measurement packet, transmission of distance measurement packets which will not reach the radio communication device 20' can be prevented so that the usage of the communication resource amount can be reduced. An illustrative example of radio communication controlled by such communication control unit 244 is shown in FIG. 12.

Figure 12:
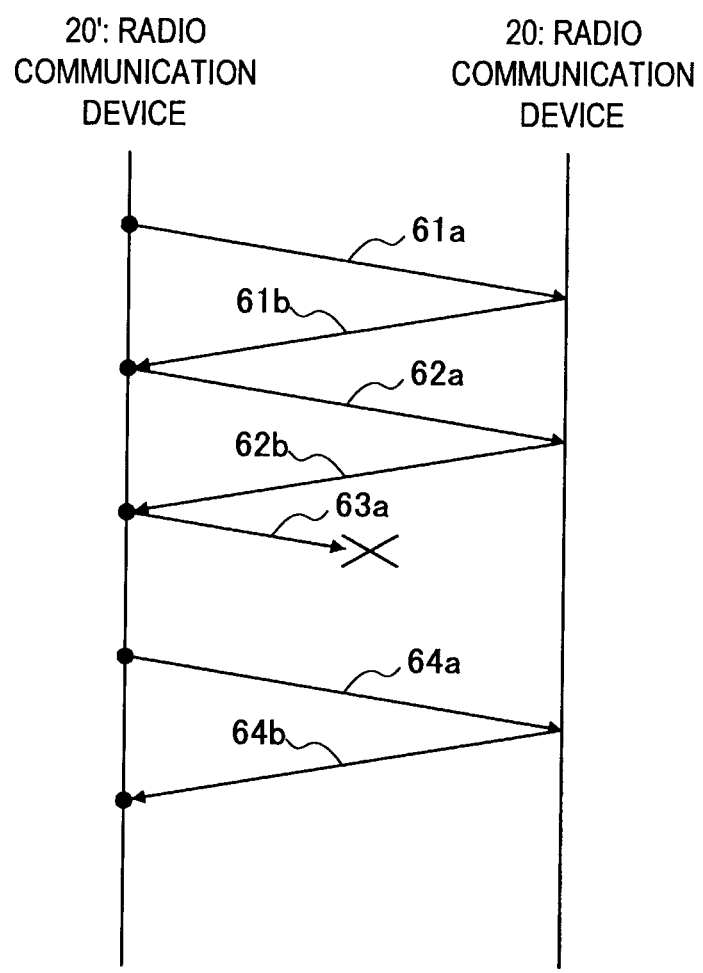
FIG. 12 is an explanatory view showing an illustrative example of radio communication controlled by a communication control unit.

FIG. 12 is an explanatory view showing the illustrative example of the radio communication controlled by the communication control unit 244. As shown in FIG. 12, the radio communication device 20' periodically transmits distance measurement packets 61a, 62a, 63a and 64a. The radio communication device 20 transmits a distance measurement packet 61b triggered by a reception of the distance measurement packet 61a. Further, the radio communication device 20 transmits a distance measurement packet 62b triggered by a reception of the distance measurement packet 62a.

On the other hand, since the distance measurement packet 63a transmitted from the radio communication device 20' does not reach the radio communication device 20, the radio communication device 20 does not transmit a distance measurement packet to respond the distance measurement packet 63a. After that, the radio communication device 20 transmits a distance measurement packet 64b in response to a reception of the distance measurement packet 64a. Here, the radio communication device 20 may perform transmitting the distance measurement packet and recoding the field intensity and noise floor of the received distance measurement packet to the memory unit 228, in advance or in parallel. Further, the communication control unit 244 may have a function for generating a distance measurement packet.

Further, based on the above-described determination result (whether the estimated distance from the radio communication device 20' satisfies a predetermined condition) in the estimation unit 232, the communication control unit 244 can transmit a radio signal having information of the determination result to the communication unit 216. The communication control unit 244 may transmit a radio signal having information of the determination result over the distance measurement packet.

Here, since the radio communication device 20' can have substantially the same function as that of the radio communication device 20, explanation of detail functions of the radio communication device 20' is omitted.

[2-3] Operation of Radio Communication Device

Functions of the radio communication device 20 according to the present embodiment have been described with reference to FIGS. 2 to 12. Next, a radio communication method executed between the radio communication device 20 and the radio communication device 20' will be described with reference to FIGS. 13 to 15.

Figure 13:
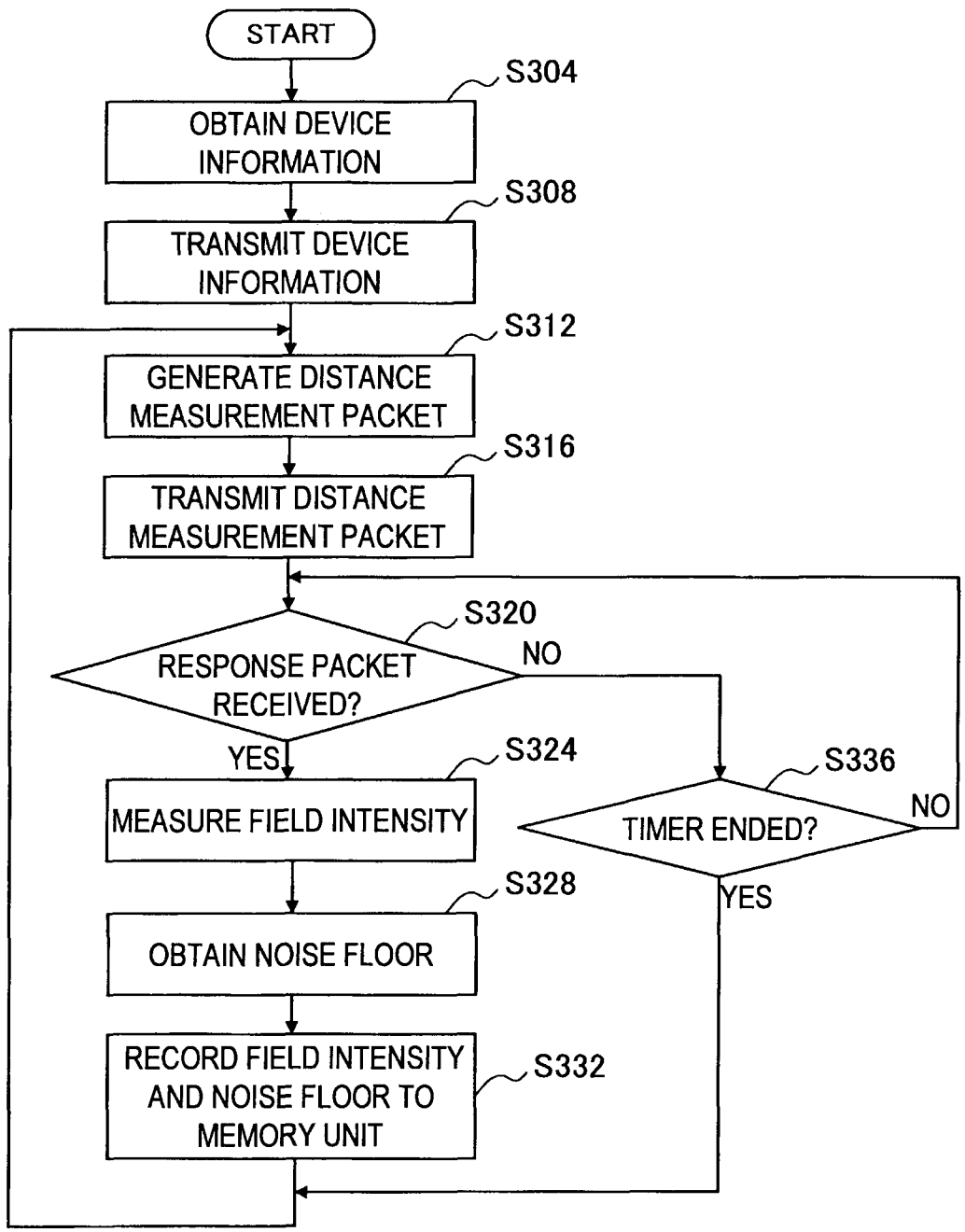
FIG. 13 is a flowchart showing an operation flow of a radio communication device on the transmitting side.

FIG. 13 is a flowchart showing an operation flow of the radio communication device 20' on the transmitting side. As shown in FIG. 13, firstly, the radio communication device 20' obtains device information thereof (S304) and transmits the device information to the radio communication device 20 on the receiving side (S308).

After that, the radio communication device 20' generates a distance measurement packet (S312) and transmits the distance measurement packet to the radio communication device 20 on the receiving side (S316). Then, when the radio communication device 20' receives a distance measurement packet from the radio communication device 20 as a response to the transmitted distance measurement packet (S320), the radio communication device 20' measures a field intensity of the received distance measurement packet (S324). Further, the radio communication device 20' obtains a noise floor of the received distance measurement packet (S328). Then, the radio communication device 20' records the field intensity and noise floor to a memory unit (corresponding to the memory unit 228 in FIG. 3) (S332).

Further, when the distance measurement packet is transmitted to the radio communication device 20 on the receiving side (S316) but a distance measurement packet is not received as a response from the radio communication device 20 (S320), the radio communication device 20' determines whether a timer has ended (S336). When the time has ended, the radio communication device 20' repeats the process from S312 and, when the time has not ended, the radio communication device 20' repeats the process from S320.

Figure 14:
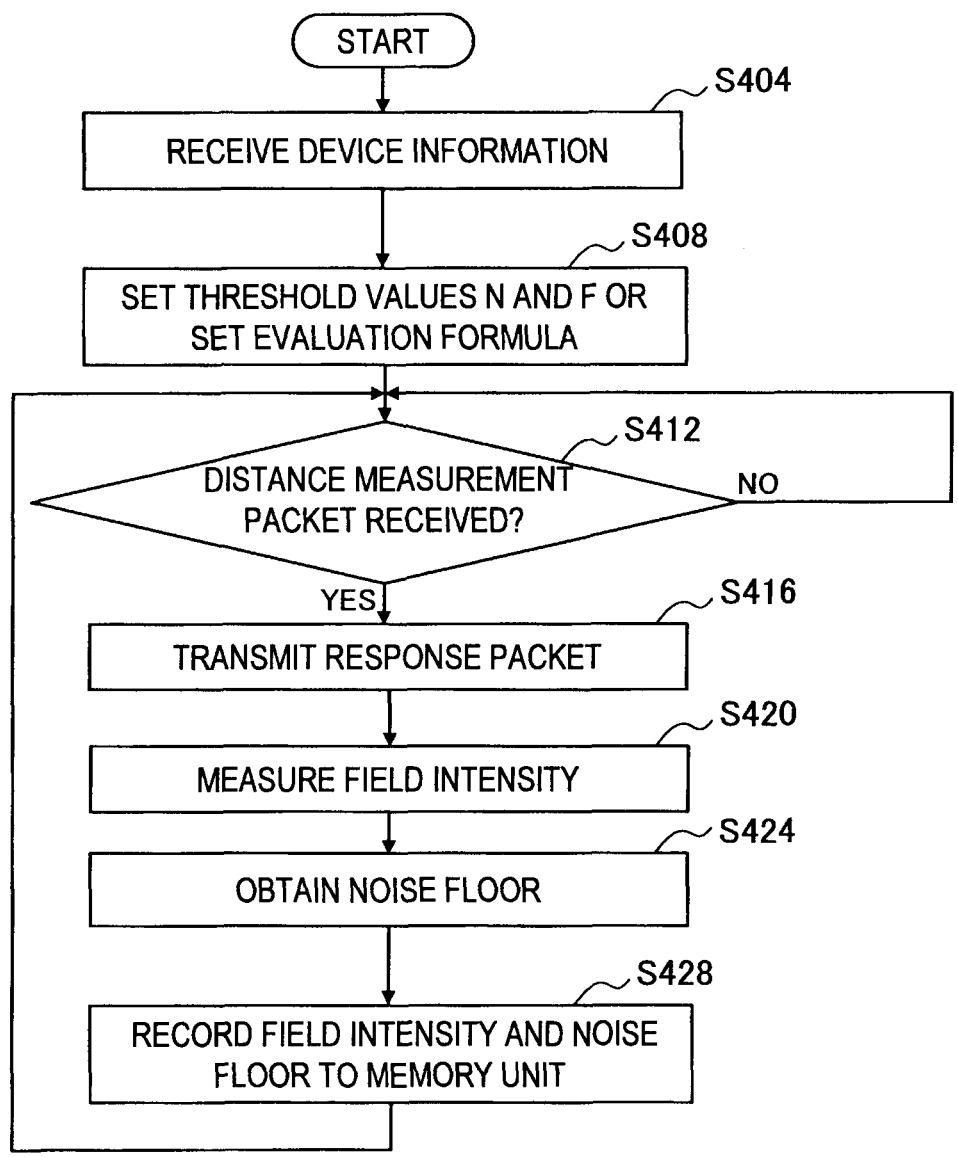
FIG. 14 is a flowchart showing an operation flow of a radio communication device on the receiving side.
Figure 15:
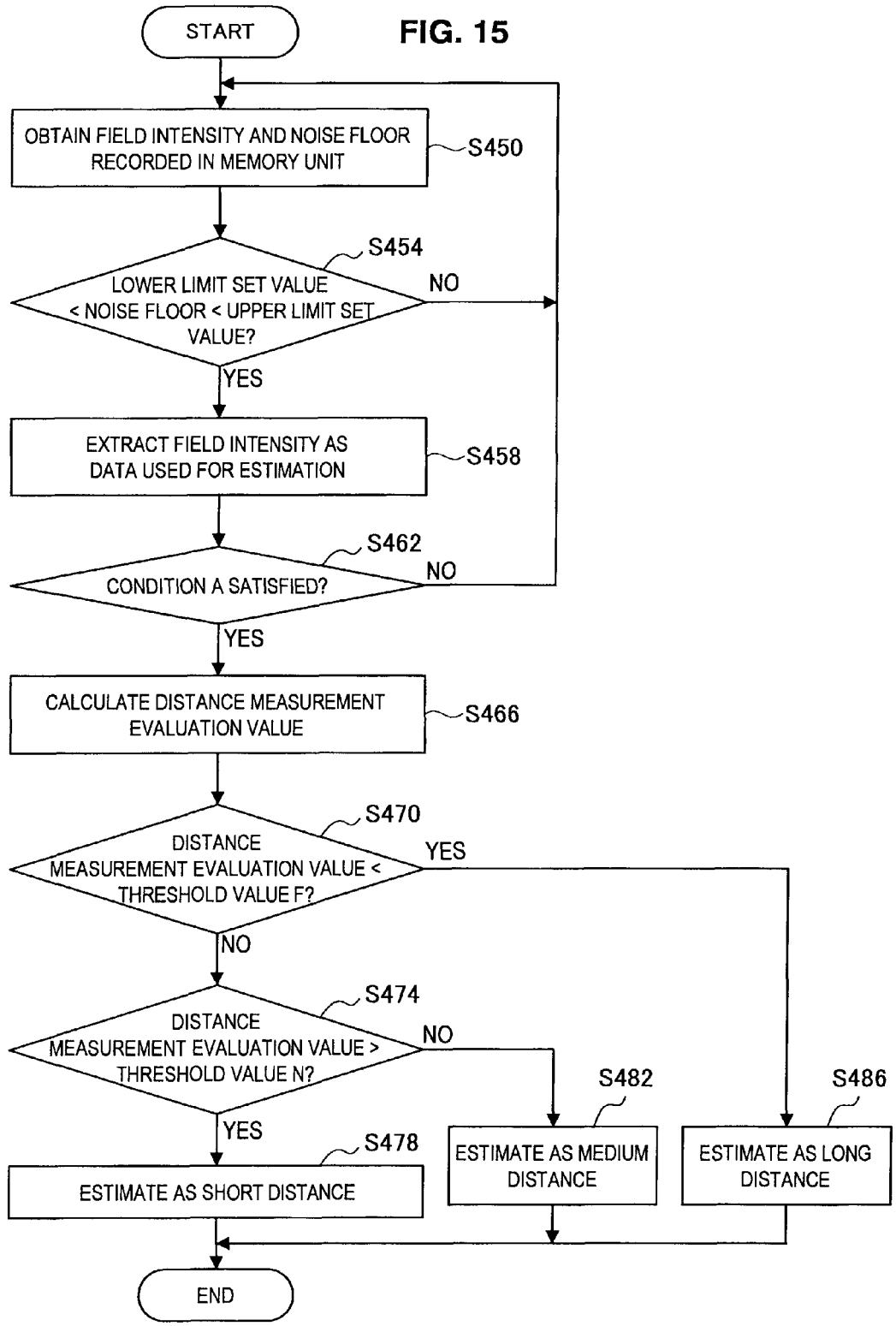
FIG. 15 is a flowchart showing an operation flow of a radio communication device on the receiving side.

FIGS. 14 and 15 are flowcharts showing operation flows of the radio communication device 20 on the receiving side. As shown in FIG. 14, firstly, the radio communication device 20 receives device information of the radio communication device 20' from the radio communication device 20' (S404). Then, the estimation unit 232 sets threshold values N and F or an evaluation formula to threshold values N and F or an evaluation formula associated with the received device information and stored in the memory unit 228 (S408).

Then, when a distance measurement packet is received from the radio communication device 20' (S412), in the radio communication device 20, the communication control unit 244 controls the communication unit 216 to transmit a distance measurement packet as a response packet (S416). Further, the field intensity measurement unit 220 measures a field intensity of the received distance measurement packet (S420) and the noise floor measurement unit 224 obtains a noise floor of the received distance measurement packet (S424). Then, the field intensity and noise floor are recorded in the memory unit 228 (S428).

After that, as shown in FIG. 15, the estimation unit 232 obtains the pairs of the field intensity and noise floor stored in the memory unit 228 (S450). Next, the determination unit 236 determines whether the noise floor value included in the respective pairs of the field intensity and noise floor is greater than the set lower limit value and smaller than the set upper limit value (S454). Then, the determination unit 236 extracts a field intensity of the pair of the noise floor, which is determines to be smaller than the set upper limit value, as data to be used by the estimation unit 232, and controls the estimation unit 232 to maintain the data as distance measurement database (S458).

Further, the estimation unit 232 determines whether the above condition A is satisfied and, when the condition A is satisfied, calculates a distance measurement evaluation value according to the distance measurement database and a previously set evaluation formula (S466). Then, when the distance measurement evaluation value is smaller than the threshold value F (S470), the estimation unit 232 estimates that the distance relation with the radio communication device 20' is a long distance (S486).

On the other hand, when the distance measurement evaluation value is greater than the threshold value F (S470) and smaller than the threshold value N (S474), the estimation unit 232 estimates that the distance relationship with the radio communication device 20' is a medium distance (S482). Further, when the distance measurement evaluation value is greater than the threshold value F (S470) and greater than threshold value N (S474), the estimation unit 232 estimates that the distance relationship with the radio communication device 20' is a short distance (S478).

[3] Summary

As described above, in this embodiment, the determination unit 236 determines whether the pair of the field intensity and the noise floor value stored in the memory unit 228 satisfy a predetermined condition. When the noise floor value is greater than an set upper limit value, it is assumed that the reception environment for receiving the distance measurement packet by the communication unit 216 is remarkably deteriorated. Further, when the noise floor value is lower than a set lower limit value, it is assumed that the reception environment for receiving the distance measurement packet by the communication unit 216 is temporarily excessively good. Thus, when the noise floor value is greater than the set lower limit value and lower than the set upper limit value, it is assumed that the reception environment for receiving the distance measurement packet by the communication unit 216 is almost in a steady state.

Thus, the determination unit 236 determines that the predetermined condition is satisfied when the noise floor value is greater than the set lower limit value and lower than the set upper limit value as described above, so that the estimation unit 232 can estimate the distance from the radio communication device 20' based on the field intensity that is assumed to be almost in a steady state. Consequently, the radio communication device 20 can estimate the distance from the radio communication device 20' with higher accuracy in real time.

Further, since the communication control unit 244 controls the communication unit 216 to transmit a radio signal in response to a reception of a distance measurement packet, transmission of distance measurement packets which will not reach the radio communication device 20' can be prevented so that the usage of the communication resource amount can be reduced.

[4] Example of Application of Radio Communication System

With the above-described configuration, the radio communication device constituting the radio communication system according to the embodiment of the present invention can estimate a distance between radio communication devices with higher accuracy in real time. Thus, with use of the radio communication device according to the embodiment of the present invention, it is possible to implement a service using a function that estimates a distance between radio communication devices in real time, which has not been implemented (or which has been difficult to be implemented) in a hitherto known radio communication device.

Hereinafter, the case where the radio communication system according to the embodiment of the present invention is applied to the entertainment field is described. Specifically, the case of implementing "game of tag" which is a popular play among children with use of four radio communication devices of radio communication devices 20A, 20B, 20C and 20D (which are collectively referred to hereinafter as "radio communication device 20" in some cases) according to the embodiment of the present invention is described hereinafter with reference to FIGS. 16 to 22.

Figure 16:
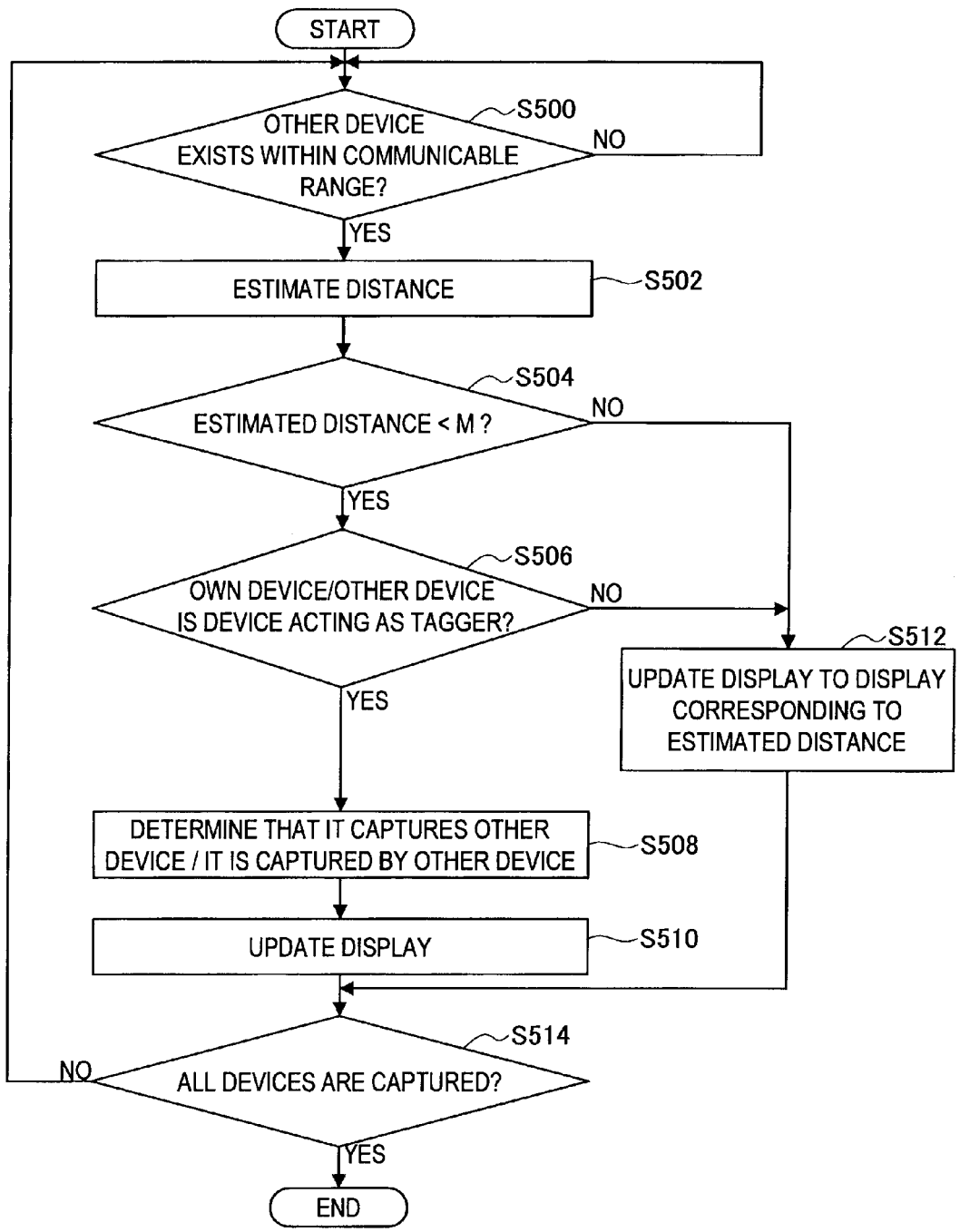
FIG. 16 is a flowchart showing an example of an operation flow of a radio communication device when a radio communication system according to an embodiment of the present invention is applied to the entertainment field.

FIG. 16 is a flowchart showing an example of an operation flow of the radio communication device when the radio communication system according to the embodiment of the present invention is applied to the entertainment field.

The radio communication device 20 determines whether other device exists within a communicable range (S500). If it is not determined in Step S500 that other device exists within the communicable range, the radio communication device 20 does not continue the process until it is determined that other device exists within the communicable range. The radio communication device 20 can perform processing of Step S500 with use of distance measurement packets transmitted from other devices, for example, through not limited thereto. For example, the radio communication device 20 may recognize other device which exists on the periphery of its own device and with which communication is possible by using Hello message or the like.

If it is determined in Step S500 that other device exists within the communicable range, the radio communication device 20 estimates a distance from the device (S502). The radio communication device may estimate the distance in real time by deriving a distance measurement evaluation value based on the distance measurement packet transmitted from other device as described above. Further, the processing in Step S502 is performed with respect to each radio communication device 20 on each of the radio communication devices 20 existing within the communicable range.

Further, each radio communication device 20 can transmit a two-bit distance measurement packet in which first information indicating "whether its own device is a device acting as a tagger" is set to the high-order one bit and second information indicating "whether its own device is caught by a device acting as a tagger" is set to the low-order one bit, for example. By performing the processing of Step S502 with use of the distance measurement packet to which the first information and the second information are set, each radio communication device 20 can estimate a distance from other device in real time. Further, by performing the processing of Step S502 with use of the distance measurement packet to which the first information and the second information are set, each radio communication device 20 can recognize which radio communication device 20 is a device acting as a tagger and which radio communication device 20 is caught by a device acting as a tagger. The second information corresponds to information that is set by the communication control unit 244 based on the above-described determination result (whether the estimated distance from other device satisfies a predetermined condition) in the estimation unit 232.

If the distance from other device is estimated in Step S502 (hereinafter, the distance estimated in Step S502 is referred to as "estimated distance"), the radio communication device 20 determines whether the estimated distance satisfies a predetermined condition (S504). Step S504 shown in FIG. 16 shows the case where the predetermined condition is set to "when the estimated distance is shorter than a predetermined distance M". The certain distance M indicates a distance at which it is caught by a device acting as a tagger, and the predetermined distance M may be set to an arbitrary value in this embodiment. Thus, a device acting as a tagger is more likely to catch other device as the predetermined distance M is set to be larger, and other device is less likely to be caught by a device acting as a tagger as the predetermined distance M is set to be larger. Further, the predetermined distance M is set to each of the radio communication devices 20 at the start of "game of tag", for example.

[When it is not Determined that Estimated Distance Satisfies Predetermined Condition]

When it is not determined in Step S504 that the estimated distance satisfies a predetermined condition, the radio communication device 20 updates the display of the display unit 240 to a display corresponding to the estimated distance (S512).

<Display Example in First Situation>

A display example in a first situation of "game of tag" using the radio communication device according to the embodiment of the present invention is described hereinafter with reference to FIGS. 17 to 19. The first situation is where other device is not caught by a device acting as a tagger.

Figure 17:
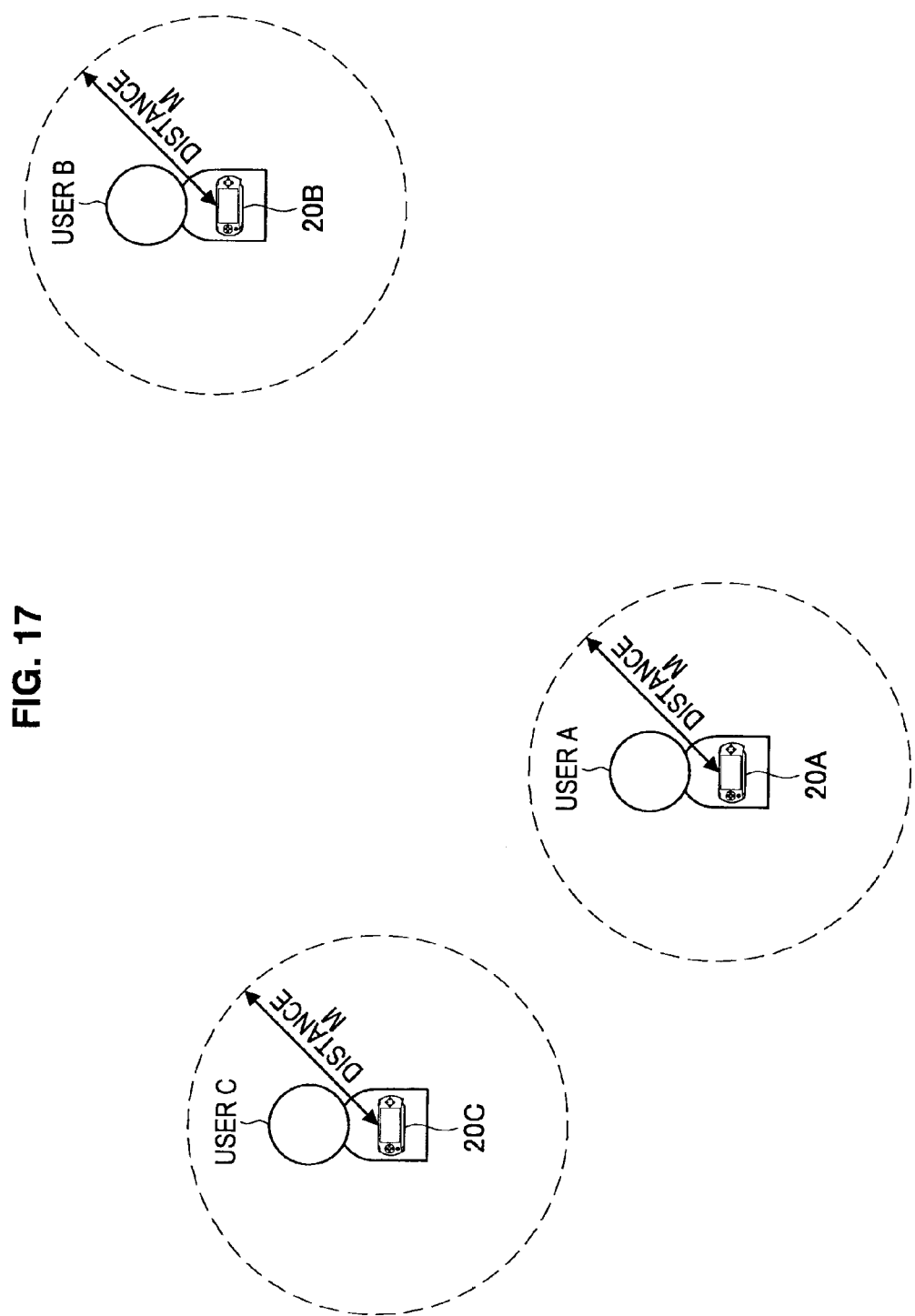
FIG. 17 is a first explanatory view to explain "game of tag" using a radio communication device according to an embodiment of the present invention.

FIG. 17 is a first explanatory view to explain "game of tag" using the radio communication device according to the embodiment of the present invention. FIG. 17 shows the first situation in the case where the radio communication device 20C is a device acting as a tagger, which is, a user C who possesses the radio communication device 20C is acting a tagger.

Referring to FIG. 17, in the first situation, it is known that other device does not exist within the range of the predetermined distance M from the radio communication device 20C being a device acting as a tagger. In this case, the radio communication device 20C estimates distances based on the received distance measurement packets transmitted from each of the radio communication devices 20A, 20B and 20D and performs display corresponding to the estimated distances.

Figure 18:
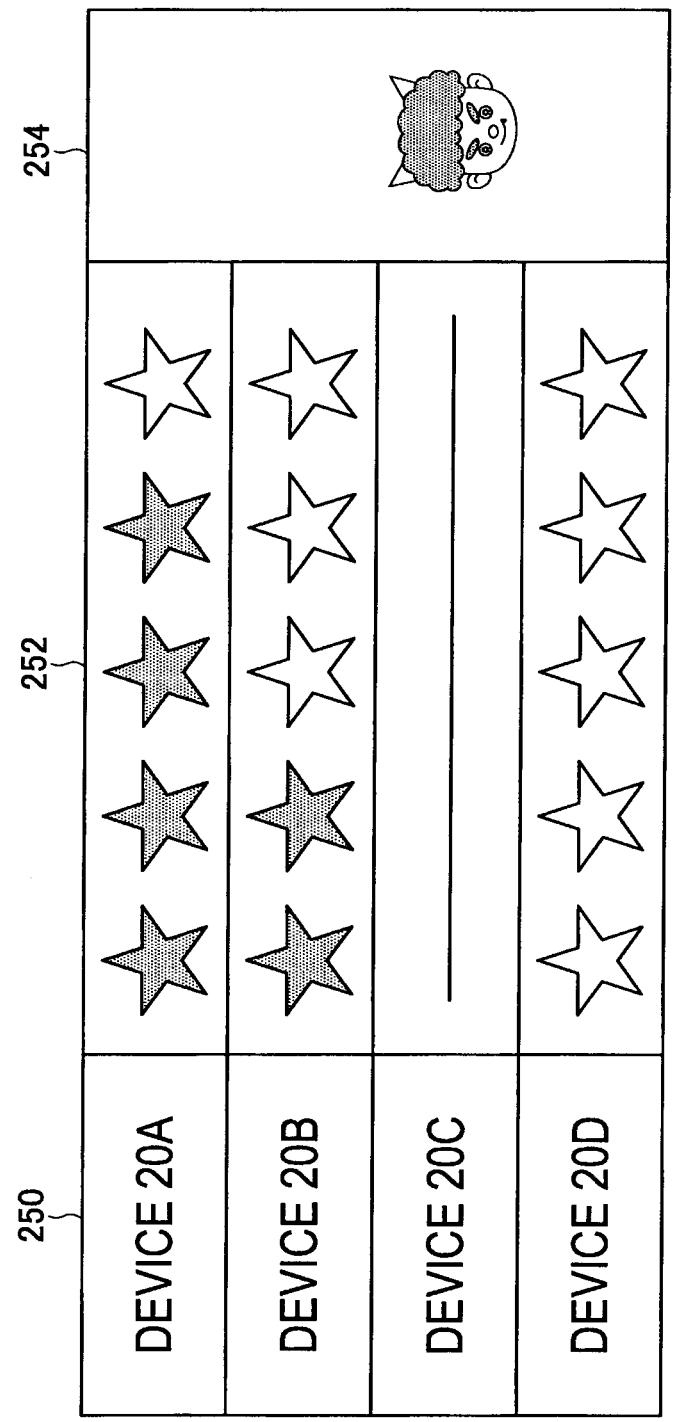
FIG. 18 is a second explanatory view to explain "game of tag" using a radio communication device according to an embodiment of the present invention.

FIG. 18 is a second explanatory view to explain "game of tag" using the radio communication device according to the embodiment of the present invention. FIG. 18 shows an example of a display to be displayed on the display unit 240 of the radio communication device 20C in the first situation shown in FIG. 17. Referring to FIG. 18, a radio communication device name display part (symbol 250), a distance indicator (symbol 252) and a device information display part (symbol 254) are displayed on the display unit 240 of the radio communication device 20C.

The radio communication device name display part (symbol 250) is a part that displays radio communication device names being involved in "game of tag". FIG. 18 shows an example in which four radio communication devices of radio communication devices 20A, 20B, 20C and 20D are involved in "game of tag". The information displayed in the radio communication device name display part (symbol 250) is not limited thereto, and it may information for identifying each radio communication device or each user, such as a user name or handle, for example.

The distance indicator (symbol 252) corresponds to the part that displays the distance information described above and has the role of notifying a user with distances from other devices by visually indicating the estimated distances. FIG. 18 shows an example in which the estimated distance is represented in five levels by lighting of star marks. In the example of FIG. 18, the number of star marks lighting up in the distance indicator increases as the estimated distance from other device is shorter, according to the derived estimated distance. In this manner, the display of the distance indicator that is displayed on the display unit 240 of the radio communication device 20C changes depending on the estimated distance, so that a user C who possesses the radio communication device 20C can recognize which user exists at what distance apart (to be exact, which radio communication device exists at what distance apart). For example, by the display of the distance indicator shown in FIG. 18, the user C can visually recognize that the radio communication device 20A exists in a close place. Further, by the display of the distance indicator shown in FIG. 18, the user C can visually recognize that the radio communication device 20B exists in a place farther than the radio communication device 20A and that the radio communication device 20D exists at a long distance.

The device information display part (symbol 254) is a part that specifies device identification information such as a device acting as a tagger or a device caught by a device acting as a tagger, for example. The radio communication device 20C determines whether its own device is a device acting as a tagger based on the above-described first information set to the distance measurement packet transmitted from its own device, for example, and performs display of the device information display part (symbol 254). Further, the radio communication device 20C performs display of the device information display part (symbol 254) based on the first information and the second information set to the distance measurement packets respectively transmitted from the radio communication devices 20A, 20B and 20D, for example. FIG. 18 shows an example in which the radio communication device 20C displays an icon indicating that the radio communication device 20C is a device acting as a tagger in the device information display part (symbol 254); however, a display method in the device information display part (symbol 254) is not limited thereto.

The device identification information is specified on the display unit 240 of the respective radio communication devices 20A to 20D, so that each user of the radio communication devices 20A to 20D can recognize who is acting as a tagger (to be exact, which radio communication device is a device acting as a tagger) and who is caught. For example, because it is indicated in FIG. 18 that the radio communication device 20C is acting as a tagger in the device information display part (symbol 254), the user C can recognize that he/she is acting as a tagger.

The other radio communication devices 20A, 20B and 20D in the first situation shown in FIG. 17 are described hereinafter, taking the radio communication device 20A as an example. The radio communication device 20A, like the radio communication device 20C, estimates a distance based on the received distance measurement packet and performs display depending on the estimated distance. The radio communication devices 20B and 20D can perform processing in the same manner as the radio communication device 20A, and description thereof is omitted.

Figure 19:
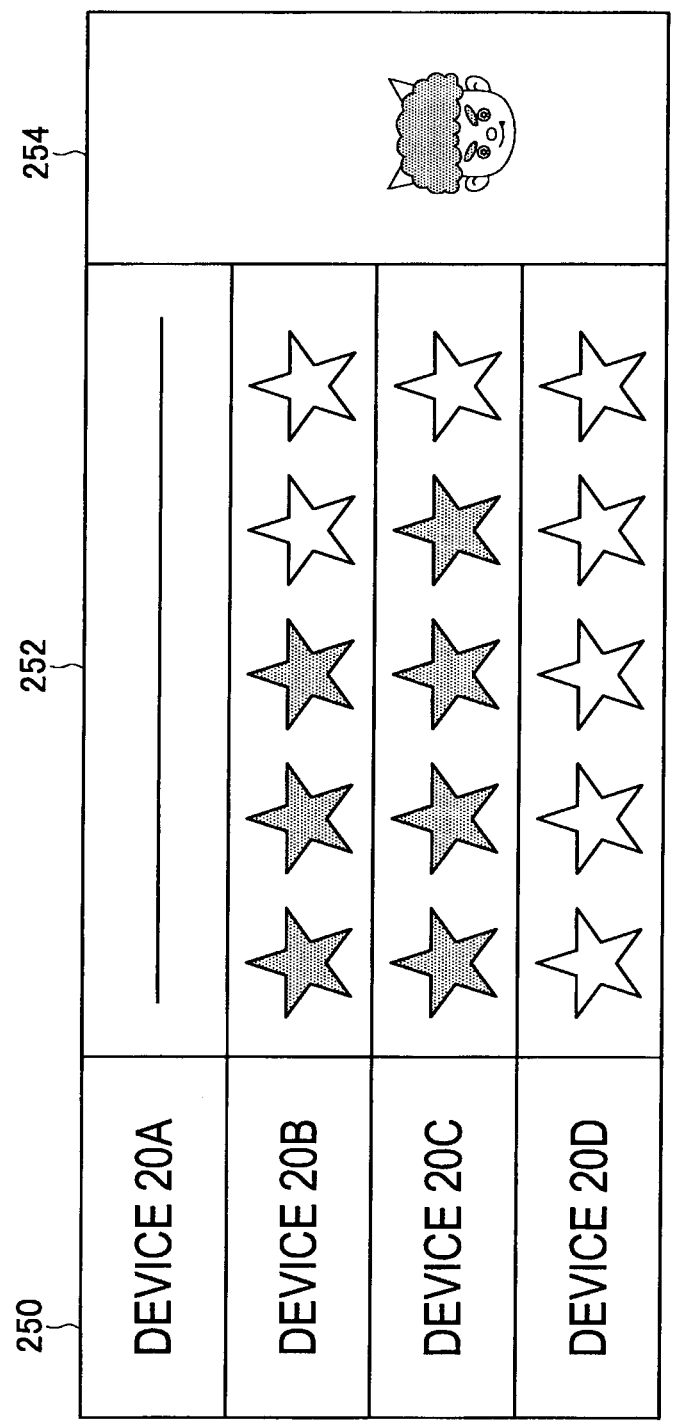
FIG. 19 is a third explanatory view to explain "game of tag" using a radio communication device according to an embodiment of the present invention.

FIG. 19 is a third explanatory view to explain "game of tag" using the radio communication device according to the embodiment of the present invention. FIG. 19 shows an example of a display to be displayed on the display unit 240 of the radio communication device 20A in the first situation shown in FIG. 17. Referring to FIG. 19, the radio communication device name display part (symbol 250), the distance indicator (symbol 252) and the device information display part (symbol 254) are displayed on the display unit 240 of the radio communication device 20A, just like the radio communication device 20C shown in FIG. 18.

The radio communication device 20A updates the display of the distance indicator (symbol 252) according to the estimated distance estimated based on the distance measurement packets transmitted from the radio communication device 20C acting as a tagger or the other radio communication devices. Further, the radio communication device 20A specifies that the radio communication device 20C is a device acting as a tagger in the device information display part (symbol 254) based on the first information set to the distance measurement packet transmitted from the radio communication device 20C. Thus, a user A who possesses the radio communication device 20A can recognize at what distance apart the user C acting as a tagger exists (to be exact, at what distance apart the radio communication device 20C exists). Likewise, the user A who possesses the radio communication device 20A can also recognize at what distance apart the user B and the user D exist.

In the first situation shown in FIG. 17, the display as shown in FIG. 18 or 19 is made on each of the radio communication devices 20A, 20B, 20C and 20D. Thus, the user C acting as a tagger can recognize at what distance apart the user A, the user B and the user D exist. Likewise, each of the user A, the user B and the user D can recognize at what distance apart the user C acting as a tagger exists.

Referring again to FIG. 16, an operation flow of the radio communication device when the radio communication system according to the embodiment of the present invention is applied to the entertainment field is described. After update of a display is performed in Step S512, the radio communication device 20 determines whether all devices involved in "game of tag" are caught by a device acting as a tagger (S514). The radio communication device 20 can perform processing of Step S514 based on the device identification information displayed on the display unit 240, although not limited thereto.

If it is determined in Step S514 that all devices involved in "game of tag" are caught by a device acting as a tagger, the radio communication device 20 exits "game of tag". At this time, the radio communication device 20 may transmit the distance measurement packet having information notifying exit of "game of tag" to the other radio communication devices.

Further, if it is not determined in Step S514 that all devices involved in "game of tag" are caught by a device acting as a tagger, the radio communication device 20 repeats processing from Step S500.

[When it is Determined that Estimated Distance Satisfies Predetermined Condition]

When it is determined in Step S504 that the estimated distance satisfies a predetermined condition, the radio communication device 20 determines whether its own device or other device corresponding to the derived estimated distance is a device acting as a tagger (S506). The radio communication device 20 may perform processing of Step S506 based on the first information (information indicating "whether its own device is a device acting as a tagger") set to the distance measurement packet, for example.

If it is not determined in Step S506 that its own device or other device corresponding to the derived estimated distance is a device acting as a tagger, the radio communication device 20 updates the display of the display unit 240 to a display corresponding to the estimated distance (S512). Then, the radio communication device 20 determines whether all devices involved in "game of tag" are caught by a device acting as a tagger (S514).

If it is determined in Step S506 that its own device or other device corresponding to the derived estimated distance is a device acting as a tagger, the radio communication device 20 determines that it has caught other device (when its own device is acting as a tagger) or it is caught by other device (when its own device is not acting as a tagger) (S510). Then, the radio communication device 20 updates the display of the display unit 240 (S512).

<Display Example in Second Situation>

A display example in a second situation of "game of tag" using the radio communication device according to the embodiment of the present invention is described hereinafter with reference to FIGS. 20 to 22. The second situation is where other device is caught by a device acting as a tagger.

Figure 20:
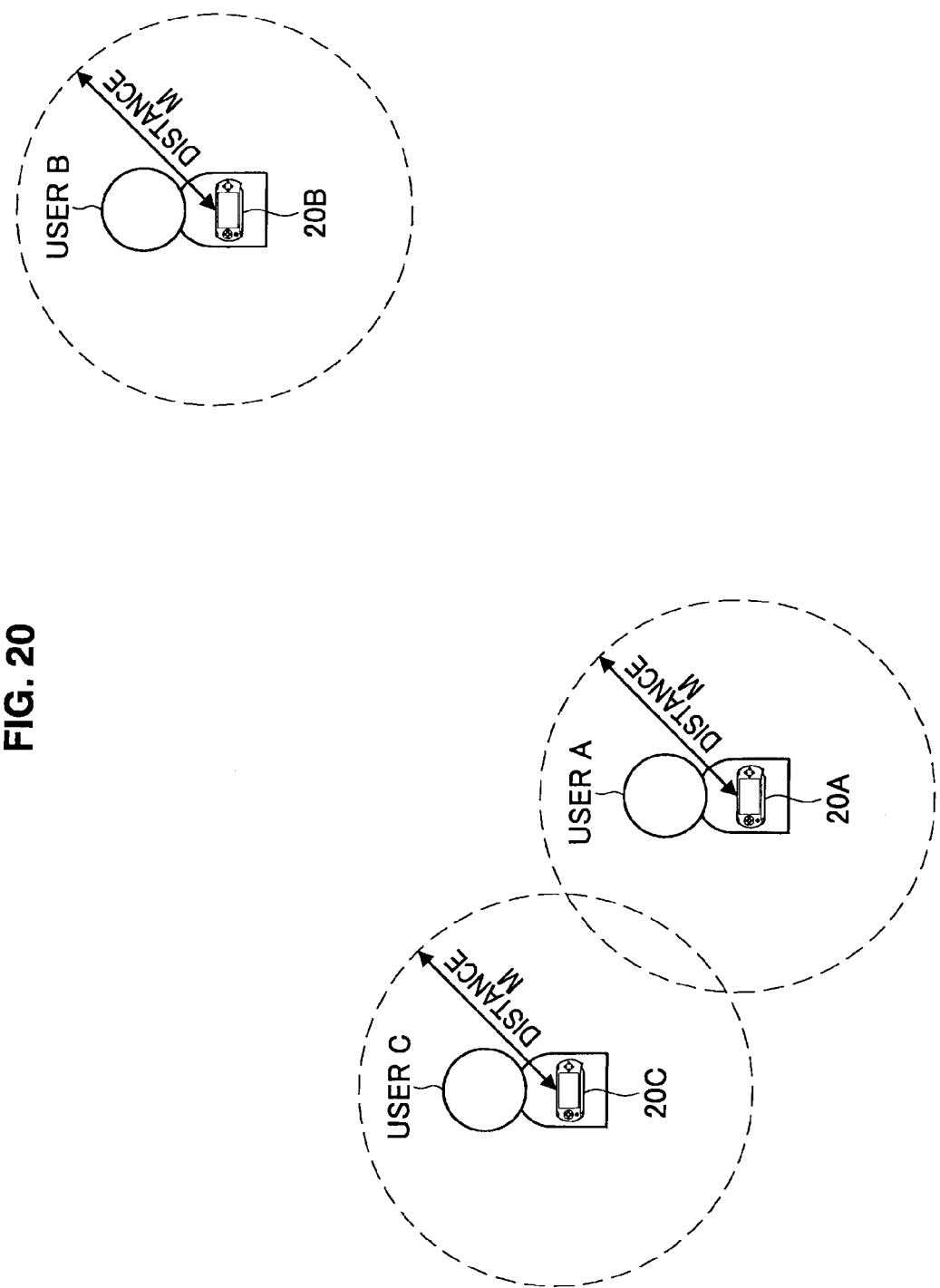
FIG. 20 is a fourth explanatory view to explain "game of tag" using a radio communication device according to an embodiment of the present invention.

FIG. 20 is a fourth explanatory view to explain "game of tag" using the radio communication device according to the embodiment of the present invention. FIG. 20 shows the second situation in the case where the radio communication device 20C is a device acting as a tagger, which is, the user C who possesses the radio communication device 20C is acting a tagger.

Referring to FIG. 20, in the second situation, the radio communication device 20A exists within the range of the predetermined distance M from the radio communication device 20C which is a device acting a tagger. In this case, the radio communication device 20C estimates distances based on the received distance measurement packets transmitted from each of the radio communication devices 20A, 20B and 20D and performs display corresponding to the estimated distances, as in the first situation described above.

Figure 21:
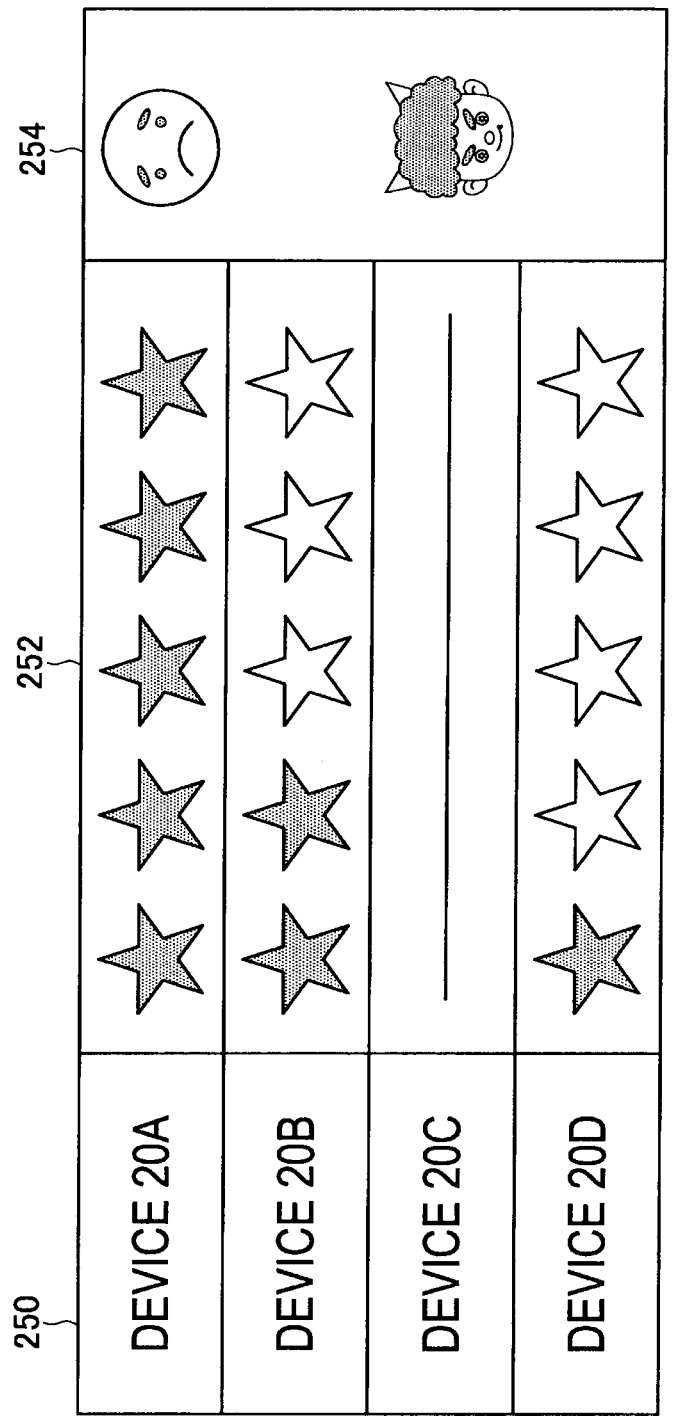
FIG. 21 is a fifth explanatory view to explain "game of tag" using a radio communication device according to an embodiment of the present invention.

FIG. 21 is a fifth explanatory view to explain "game of tag" using the radio communication device according to the embodiment of the present invention. FIG. 21 shows an example of a display to be displayed on the display unit 240 of the radio communication device 20C in the second situation shown in FIG. 20.

The radio communication device 20C updates the display of the distance indicator (symbol 252) according to the estimated distances estimated based on the distance measurement packets transmitted respectively from the radio communication devices 20A, 20B and 20D. Because the estimated distance from the radio communication device 20A is shorter than the predetermined distance M, the radio communication device 20C determines that it has caught the radio communication device 20A. Then, the radio communication device 20C specifies that it has caught the radio communication device 20A in the device information display part (symbol 254) (display of information according to a determination result). FIG. 21 shows an example in which the radio communication device 20C displays an icon indicating that it has caught the radio communication device 20A in the device information display part (symbol 254), a display method in the device information display part (symbol 254) is not limited thereto.

Further, when the radio communication device 20C determines that it has caught the radio communication device 20A, it may transmit the distance measurement packet having information notifying that it has caught the radio communication device 20A to the radio communication device 20A.

Next, the other radio communication devices 20A, 20B and 20D in the second situation shown in FIG. 20 are described, taking the radio communication device 20A as an example. The radio communication device 20A, like the radio communication device 20C, estimates a distance based on the received distance measurement packet and performs display depending on the estimated distance. The radio communication devices 20B and 20D can perform processing in the same manner as the radio communication device 20A, and description thereof is omitted.

Figure 22:
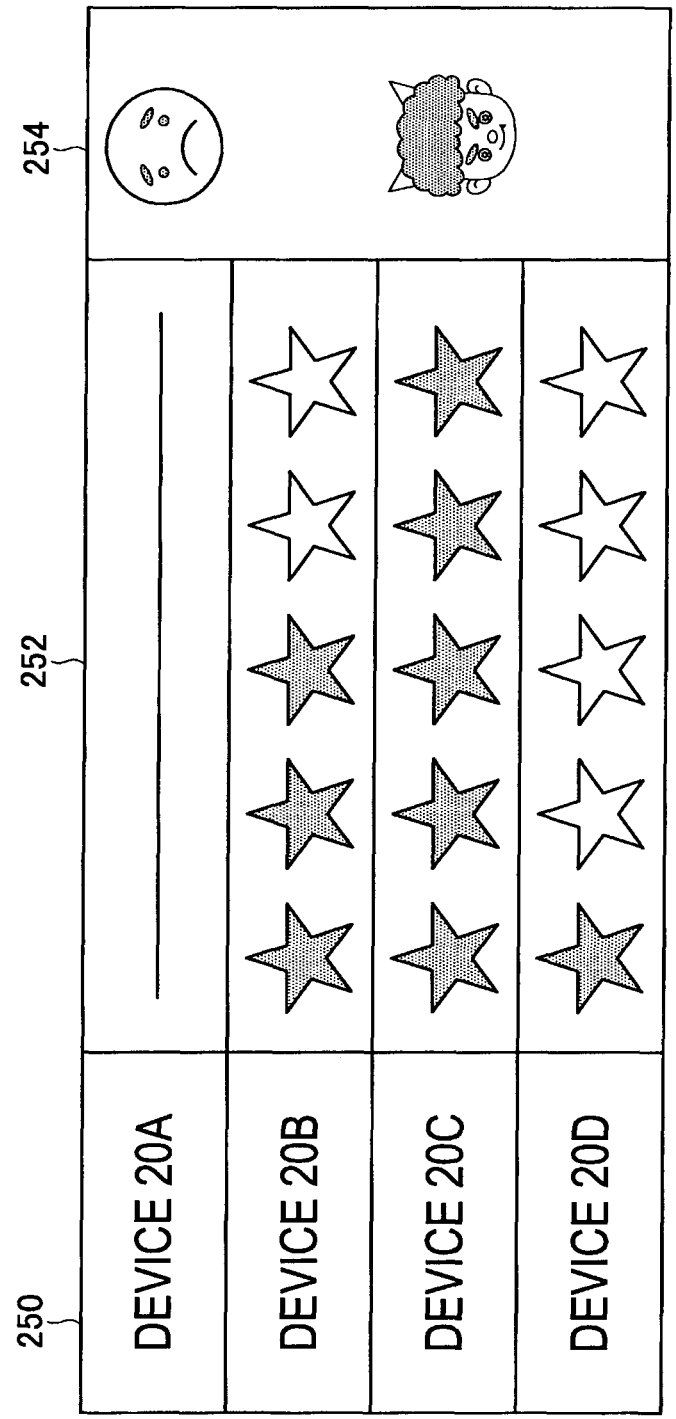
FIG. 22 is a sixth explanatory view to explain "game of tag" using a radio communication device according to an embodiment of the present invention.

FIG. 22 is a sixth explanatory view to explain "game of tag" using the radio communication device according to the embodiment of the present invention. FIG. 22 shows an example of a display to be displayed on the display unit 240 of the radio communication device 20A in the second situation shown in FIG. 20.

The radio communication device 20A updates the display of the distance indicator (symbol 252) according to the estimated distances estimated based on the distance measurement packets transmitted from the radio communication device 20C being a device acting as a tagger or the other radio communication devices. Because the estimated distance from the radio communication device 20C is shorter than the predetermined distance M, the radio communication device 20A determines that it has been caught by the radio communication device 20C. Then, the radio communication device 20A specifies that it has been caught by the radio communication device 20C in the device information display part (symbol 254) (display of information according to a determination result). FIG. 22 shows an example in which the radio communication device 20A displays an icon indicating that it has been caught by the radio communication device 20C in the device information display part (symbol 254), a display method in the device information display part (symbol 254) is not limited thereto.

Further, when the radio communication device 20A determines that it has been caught by the radio communication device 20C, it transmits the distance measurement packet in which the second information (information indicating "whether its own device is caught by a device acting as a tagger") is set to a value indicating that it is caught by a device acting as a tagger. Thus, each radio communication device 20 that has received the distance measurement packet transmitted from the radio communication device 20A can recognize that the radio communication device 20A is caught by the radio communication device 20C (a device acting as a tagger).

In the second situation shown in FIG. 20, the display as shown in FIG. 21 or 22 is made on each of the radio communication devices 20A, 20B, 20C and 20D. Thus, the user C acting as a tagger can recognize a user who is caught. Further, each of the user A, the user B and the user D can recognize which user is caught by the user C acting as a tagger.

Referring again to FIG. 16, an operation flow of the radio communication device when the radio communication system according to the embodiment of the present invention is applied to the entertainment field is described. After update of a display is performed in Step S510, the radio communication device 20 determines whether all devices involved in "game of tag" are caught by a device acting as a tagger (S514). If it is determined in Step S514 that all devices involved in "game of tag" are caught by a device acting as a tagger, the radio communication device 20 exits "game of tag". Further, if it is not determined in Step S514 that all devices involved in "game of tag" are caught by a device acting as a tagger, the radio communication device 20 repeats processing from Step S500.

By performing the process shown in FIG. 16, for example, in each radio communication device 20 according to the embodiment of the present invention, "game of tag" can be implemented. Note that, although the case where the radio communication device 20 according to the embodiment of the present invention is applied to "game of tag" is described in the foregoing, an application example is not limited thereto. For example, the radio communication device 20 according to the embodiment of the present invention may be applied to various games such as "hide-and-seek", "kick the can" or "fox hunting", utilizing the capability of estimating a distance between radio communication devices with higher accuracy in real time.

Further, the radio communication device 20 according to the embodiment of the present invention may utilize the capability of estimating a distance between radio communication devices with higher accuracy in real time for user interfaces of games. Utilization for user interfaces includes changing the color scheme or layout of a display screen displayed on the display unit 240 according to the estimated distance, for example, though not limited thereto.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, although the case where the estimation unit 232 estimates the distance from the radio communication device 20' as a long distance, a medium distance or a short distance is described in the above embodiment, the present invention is not limited thereto. For example, the estimation unit 232 may estimate the distance from the radio communication device 20' in units of m (meters).

Further, although the case where the determination unit 236 performs filtering based on the noise floor is described in the above embodiment, the present invention is not limited thereto. For example, the determination unit 236 may perform filtering based on the amount of noise component such as SN ratio of distance measurement packets.

Further, it is not always necessary to perform each step in the processing of the radio communication devices 20 and 20' in this specification according to the sequences shown as the flowcharts. For example, each step in the processing of the radio communication devices 20 and 20' may include processing performed in parallel or individually (e.g. parallel processing or object processing).

Furthermore, it is possible to create a computer program that causes hardware such as the CPU 201, ROM 202 and RAM 203 incorporated in the radio communication devices 20 and 20' to function equally to the respective elements of the radio communication devices 20 and 20' described above. Further, a storage medium that stores such a computer program may be provided. Each functional block shown in the functional block diagram of FIG. 3 may be implemented by hardware, thereby achieving a series of processing on hardware.

The above-described configuration illustrates an example of embodiments of the present invention, and it will naturally come under the technical scope of the present invention.

The invention claimed is:

1. A radio communication device comprising:
a reception unit that receives a radio signal;
a measurement unit that measures a field intensity of the radio signal received by the reception unit;
a determination unit that determines whether the radio signal received by the reception unit satisfies a predetermined condition for a noise component; and
an estimation unit that estimates a distance from a transmission source device of the radio signal based on the field intensity of the radio signal determined by the determination unit to satisfy the predetermined condition;
wherein the estimation unit calculates an average value of the field intensity of the radio signal determined by the determination unit to satisfy the predetermined condition, determines in which of defined average value ranges the average value is included, and estimates the distance from the transmission source device of the radio signal to be a distance corresponding to the average value range in which the average value is determined to be included.

2. The radio communication device according to claim 1, wherein the determination unit determines that the predetermined condition is satisfied when the noise component of the radio signal is greater than a set lower limit value and lower than an set upper limit value.

3. The radio communication device according to claim 1, further comprising: a transmission unit that transmits a radio signal; and a control unit that controls the transmission unit to transmit the radio signal when the radio signal is received by the reception unit.

4. The radio communication device according to claim 1, wherein the reception unit receives, from the transmission source device in advance, device information indicating a transmitting power for the radio signal from the transmission source device, and wherein the estimation unit estimates the distance from the transmission source device of the radio signal by using the device information.

5. The radio communication device according to claim 4, wherein the device information indicates the transmitting power for the radio signal from the transmission source device or a model of the transmission source device.

6. The radio communication device according to claim 1, wherein the average value ranges or calculation of the average value varies by the device information.

7. The radio communication device according to claim 1, further comprising: a display unit that displays distance information corresponding to the distance from the transmission source device estimated by the estimation unit, wherein the estimation unit causes the display unit to display the distance information for each estimated distance from the transmission source device.

8. The radio communication device according to claim 7, wherein the estimation unit determines whether the distance from the transmission source device satisfies the predetermined condition and further causes the display unit to display information corresponding to a determination result.

9. The radio communication device according to claim 8, further comprising: a transmission unit that transmits a radio signal; and a control unit that controls, based on the determination result determined by the estimation unit, the transmission unit to transmit the radio signal indicating whether the distance from the transmission source device satisfies the predetermined condition.

10. A program causing a computer to function as a radio communication device comprising:
a reception unit that receives a radio signal;
a measurement unit that measures a field intensity of the radio signal received by the reception unit;
a determination unit that determines whether the radio signal received by the reception unit satisfies a predetermined condition for a noise component; and
an estimation unit that estimates a distance from a transmission source device of the radio signal based on the field intensity of the radio signal determined by the determination unit to satisfy the predetermined condition;
wherein the estimation unit calculates an average value of the field intensity of the radio signal determined by the determination unit to satisfy the predetermined condition, determines in which of defined average value ranges the average value is included, and estimates the distance from the transmission source device of the radio signal to be a distance corresponding to the average value range in which the average value is determined to be included.

11. A radio communication method comprising the steps of:
receiving a radio signal;
measuring a field intensity of the received radio signal;
determining whether the received radio signal satisfies a predetermined condition for a noise component; and
estimating a distance from a transmission source device of the radio signal based on the field intensity of the radio signal determined to satisfy the predetermined condition;
wherein estimating a distance from the transmission source comprises calculating an average value of the field intensity of the radio signal determined by the determination unit to satisfy the predetermined condition, determining in which of defined average value ranges the average value is included, and estimating the distance from the transmission source device of the radio signal to be a distance corresponding to the average value range in which the average value is determined to be included.

12. A radio communication system comprising:

a first radio communication device; and a second radio communication device, wherein the first radio communication device transmits a radio signal to the second radio communication device; and wherein the second radio communication device includes a reception unit that receives the radio signal, a measurement unit that measures a field intensity of the radio signal received by the reception unit, a determination unit that determines whether the radio signal received by the reception unit satisfies a predetermined condition for a noise component, and an estimation unit that estimates a distance from the first radio communication device based on the field intensity of the radio signal determined by the determination unit to satisfy the predetermined condition;

wherein the estimation unit calculates an average value of the field intensity of the radio signal determined by the determination unit to satisfy the predetermined condition, determines in which of defined average value ranges the average value is included, and estimates the distance from the transmission source device of the radio signal to be a distance corresponding to the average value range in which the average value is determined to be included.

\* \* \* \* \*

UNITED STATES PATENT AND TRADEMARK OFFICE
CERTIFICATE OF CORRECTION

PATENT NO. : 8,412,113 B2  
APPLICATION NO. : 12/741551  
DATED : April 2, 2013  
INVENTOR(S) : Michinari Kohno et al.

Page 1 of 1

It is certified that error appears in the above-identified patent and that said Letters Patent is hereby corrected as shown below:

On the Title Page, after Item (73) Assignee: Sony Corporation, Tokyo (JP), before the patent term Notice, insert the following missing data from Item (73) Assignee section:

--Sony Computer Entertainment Inc., Tokyo (JP)--.

Signed and Sealed this  
First Day of April, 2014

Michelle K. Lee  
*Deputy Director of the United States Patent and Trademark Office*